United States Patent
Fan et al.

(10) Patent No.: US 7,958,113 B2
(45) Date of Patent: Jun. 7, 2011

(54) AUTOMATICALLY AND ADAPTIVELY DETERMINING EXECUTION PLANS FOR QUERIES WITH PARAMETER MARKERS

(75) Inventors: Wei Fan, New York, NY (US); Guy Maring Lohman, San Jose, CA (US); Volker Gerhard Markl, San Jose, CA (US); Nimrod Megiddo, Palo Alto, CA (US); Jun Rao, Palo Alto, CA (US); David Everett Simmen, San Jose, CA (US); Julia Stoyanovich, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 12/125,221

(22) Filed: May 22, 2008

(65) Prior Publication Data
US 2008/0222093 A1  Sep. 11, 2008

Related U.S. Application Data

(63) Continuation of application No. 11/673,091, filed on Feb. 9, 2007, now abandoned.

(51) Int. Cl.
*G06F 7/00* (2006.01)
*G06F 17/30* (2006.01)
*G06F 15/16* (2006.01)
(52) U.S. Cl. ......... 707/718; 709/235
(58) Field of Classification Search ......... 707/718; 709/235
See application file for complete search history.

(56) References Cited

U.S. PATENT DOCUMENTS

| | | | |
|---|---|---|---|
| 5,761,653 A * | 6/1998 | Schiefer et al. | 707/713 |
| 6,021,405 A | 2/2000 | Celis et al. | |
| 6,108,648 A * | 8/2000 | Lakshmi et al. | 707/2 |
| 6,219,660 B1 * | 4/2001 | Haderle et al. | 707/718 |
| 6,338,055 B1 | 1/2002 | Hagmann et al. | |
| 6,529,901 B1 | 3/2003 | Chaudhuri et al. | |
| 6,735,594 B1 | 5/2004 | Zimowski et al. | |
| 7,213,012 B2 | 5/2007 | Jakobsson | |
| 7,739,262 B2 * | 6/2010 | Larson et al. | 707/718 |
| 2005/0065921 A1 | 3/2005 | Hrle et al. | |
| 2005/0071346 A1 | 3/2005 | Bernal et al. | |

(Continued)

OTHER PUBLICATIONS

Julia Stoyanovich, Kenneth A. Ross, Jun Rao, Wei Fan, Volker Markl, and Guy Lohman. ReoptSMART: A Learning Query Plan Cache. Columbia University Computer Science Technical Report cucs-023-08, 2008, 33 pages.*

(Continued)

*Primary Examiner* — Tony Mahmoudi
*Assistant Examiner* — Brian E Weinrich
(74) *Attorney, Agent, or Firm* — Schmeiser, Olsen & Watts

(57) ABSTRACT

A method and system for automatically and adaptively determining query execution plans for parametric queries. A first classifier trained by an initial set of training points is generated. A query workload and/or database statistics are dynamically updated. A new set of training points is collected off-line. Using the new set of training points, the first classifier is modified into a second classifier. A database query is received at a runtime subsequent to the off-line phase. The query includes predicates having parameter markers bound to actual values. The predicates are associated with selectivities. A mapping of the selectivities into a plan determines the query execution plan. The determined query execution plan is included in an augmented set of training points, where the augmented set includes the initial set and the new set.

11 Claims, 21 Drawing Sheets

U.S. PATENT DOCUMENTS

| | | |
|---|---|---|
| 2005/0097078 A1 | 5/2005 | Lohman et al. |
| 2005/0192951 A1 | 9/2005 | Day et al. |
| 2006/0074875 A1 | 4/2006 | Faunce et al. |
| 2007/0233435 A1* | 10/2007 | Bradski .............................. 703/2 |

OTHER PUBLICATIONS

Wei Fan, Ed Greengrass, Joe McCloskey, Philip S. Yu and Kevin Drummey. Effective Estimation of Posterior Probabilities: Explaining the Accuracy of Randomized Decision Tree Approaches. Proceedings of the Fifth IEEE International Conference on Data Mining (ICDM'05), Houston, Texas, USA, Nov. 27-30, 2005, pp. 154-161.*

Yannis E. Ioannidis, Raymond T. Ng, Kyuseok Shim and Timos K. Sellis R. Krovetz and W. B. Croft. Parametric Query Optimization. The VLDB Journal, vol. 6, No. 2, May 1997, pp. 132-151.*

Gunning Technology Solutions, LLC; We help companies succeed with DB2, Oracle, SQL Server, and MySQL. [online]. 16 pages. [retrieved on Jun. 8, 2006]. Retrieved from the Internet:< URL: http://www.gunningts.com/db2zone.htm >.

Gunning Technology Solutions, LLC; We help companies succeed with DB2, ORACLE, SQL Server and MySQL; http://www.gunningts.com/db2zone.htm; 16 pages.

Hulgeri et al.; AniPQO: Almost Non-intrusive Parametric Query Optimization for Nonlinear Cost Functions; Proceedings of the 29th VLDB Conference, Berlin, Germany, 2003; 12 pages.

Dietterich et al.; Solving Multiclass Learning Problems via Error-Correcting Output Codes; Journal of Artificial Intelligence Research 2 (1995); Submitted Aug. 1994; published Jan. 1995; pp. 263-286.

Ioannidis et al; Parametric Query Optimization; In Proceedings of the 18th International Conference on Very Large Data Bases, Vancouver, Aug. 1992; 24 pages.

Fan et al.; Effective estimation of posterior probabilities: Explaining the accuracy of randomized decision tree approaches; IEEE ICDM (2005); 8 pages.

Freund et al.; A decision-theoretic generalization of on-line learning and an application to boosting; Journal of Computer and System Sciences, 55(1): pp. 119-139 (1997).

Freund et al; A short introduction to boosting; Journal of Japanese Society for Artificial Intelligence, 14(5): pp. 771-780 (1999).

Hulgeri et al.; Parametric query optimization for linear and piecewise linear cost functions; Proceedings of the 28th VLDB Conference, Hong Kong, China (2002); 12 pages.

* cited by examiner

```
Select o_id
From Item, Order_Line, Orders
Where i_id = ol_i_id And ol_o_id = o_id
And i_page > :b1 And ol_qty > :b2
And i_subject = :b3 And o_status = :b4
And i_cost < :b5
```

FIG. 8

```
Select c_id, a_lname
From Customer, Orders, Order_Line, Item, Author
Where i_a_id = a_id And ol_i_id = i_id
And ol_i_id = o_id And o_c_id = c_id
And i_subject = :b1 And i_cost < :b2
And c_birthdate < :b3 And c_discount > :b4
Fetch First 10 Rows Only
```

FIG. 9

```
Select o.city, Count(*)
From Owner o, Demographics d
Where d.ownerid = o.id And o.cars > :b1
And d.salary < :b2
Group by o.city
```

FIG. 10

```
Select count(*)
From Owner o, Car c, Demographics c,
      Accidents a, Location l, Time t
Where a.locationid = l.id And a.timeid = t.id
And a.carid = c.id And c.ownerid = o.id
And d.ownerid = o.id And t.year <= :b1
And d.salary = :b2 And o.country = :b3
```

FIG. 11

```
Select count(*)
From Owner o, Car c, Accidents a, Location l, Time t
Where a.carid = c.id And a.locationid = l.id
And a.timeid = t.id And c.ownerid = o.id
And c.year = :b1 And t.year = :b2
```

FIG. 12

| Template | Scale | Plans | Common Plans | Coverage |
|---|---|---|---|---|
| TPCW-1 (FIG. 5) | 20 | 3 | 3 | 100% |
| TPCW-1 (FIG. 5) | 100 | 4 | 2 | 90% |
| TPCW-2 (FIG. 8) | 20 | 24 | 2 | 49% |
| TPCW-2 (FIG. 8) | 100 | 23 | 2 | 43% |
| TPCW-3 (FIG. 9) | 20 | 7 | 2 | 78% |
| TPCW-3 (FIG. 9) | 100 | 10 | 3 | 85% |
| DMV-1 (FIG. 10) | 60 | 9 | 3 | 87% |

FIG. 13

| Template | Scale | AdaBoost | | | RDT | |
|---|---|---|---|---|---|---|
| | | Correct | Incorrect | No Plan | Correct | Incorrect |
| TPCW-1 (FIG. 5) | 20 | 86% | 14% | 0% | 92% | 8% |
| TPCW-1 (FIG. 5) | 100 | 77% | 9% | 14% | 93% | 7% |
| TPCW-2 (FIG. 8) | 20 | 36% | 10% | 54% | 73% | 27% |
| TPCW-2 (FIG. 8) | 100 | 31% | 6% | 63% | 76% | 24% |
| TPCW-3 (FIG. 9) | 20 | 57% | 19% | 24% | 91% | 9% |
| TPCW-3 (FIG. 9) | 100 | 58% | 23% | 19% | 89% | 11% |
| DMV-1 (FIG. 10) | 60 | 76% | 7% | 17% | 96% | 4% |

FIG. 14

| Template | Scale | Total Time(s) | | | | | AdaBoost Improvement | | RDT Improvement | |
|---|---|---|---|---|---|---|---|---|---|---|
| | | OPT | AVG | AdaBoost | RDT | | OPT | AVG | OPT | AVG |
| TPCW-1 (FIG. 5) | 20 | 0.18 | 0.062 | 0.059 | 0.059 | | 67% | 5% | 67% | 5% |
| TPCW-1 (FIG. 5) | 100 | 3.9 | 1.90 | 2.1 | 1.8 | | 46% | -11% | 54% | 5% |
| TPCW-2 (FIG. 8) | 20 | 11 | 14 | 11 | 9.7 | | 0% | 21% | 12% | 31% |
| TPCW-2 (FIG. 8) | 100 | 81 | 110 | 83 | 78 | | -2% | 25% | 4% | 29% |
| TPCW-3 (FIG. 9) | 20 | 30 | 0.25 | 7.3 | 0.27 | | 76% | -2820% | 99% | -8% |
| TPCW-3 (FIG. 9) | 100 | 35 | 15 | 20 | 5.0 | | 43% | -33% | 86% | 67% |
| DMV-1 (FIG. 10) | 60 | 190 | 200 | 180 | 180 | | 5% | 10% | 5% | 10% |

FIG. 15

| Template | Scale | Queries | Execution Time(s) | | Margin |
|---|---|---|---|---|---|
| | | | HYBRID | OPT | |
| TPCW-1 (FIG. 5) | 20 | 50 | 0.059 | 0.059 | 0% |
| TPCW-1 (FIG. 5) | 100 | 800 | 1.8 | 1.8 | 0% |
| TPCW-2 (FIG. 8) | 20 | 300 | 9.4 | 9.5 | 1% |
| TPCW-2 (FIG. 8) | 100 | 400 | 25 | 76 | 67% |
| TPCW-3 (FIG. 9) | 20 | 800 | 0.19 | 0.27 | 30% |
| TPCW-3 (FIG. 9) | 100 | 800 | 0.45 | 4.8 | 91% |
| DMV-1 (FIG. 10) | 60 | 800 | 160 | 180 | 11% |

FIG. 16

| Template | Scale | AdaBoost | | | RDT | |
|---|---|---|---|---|---|---|
| | | Correct | Incorrect | No Plan | Correct | Incorrect |
| TPCW-2 (FIG. 8) | 100 | 59% | 12% | 29% | 69% | 31% |
| TPCW-3 (FIG. 9) | 20 | 55% | 17% | 28% | 64% | 36% |
| TPCW-3 (FIG. 9) | 100 | 70% | 16% | 14% | 75% | 25% |
| DMV-1 (FIG. 10) | 60 | 66% | 21% | 13% | 82% | 18% |

FIG. 17

| Template | Scale | Total Time(s) | | | | AdaBoost Improvement | | RDT Improvement | |
|---|---|---|---|---|---|---|---|---|---|
| | | OPT | AVG | AdaBoost | RDT | OPT | AVG | OPT | AVG |
| TPCW-2 (FIG. 8) | 100 | 78 | 110 | 29 | 27 | 63% | 74% | 65% | 75% |
| TPCW-3 (FIG. 9) | 20 | 30 | 0.25 | 5 | 0.25 | 83% | -1900% | 99% | 0% |
| TPCW-3 (FIG. 9) | 100 | 35 | 16 | 5 | 0.50 | 86% | 69% | 99% | 97% |
| DMV-1 (FIG. 10) | 60 | 190 | 200 | 170 | 170 | 11% | 15% | 11% | 15% |

FIG. 18

AUTOMATICALLY AND ADAPTIVELY DETERMINING EXECUTION PLANS FOR QUERIES WITH PARAMETER MARKERS

This application is a continuation application claiming priority to Ser. No. 11/673,091, filed Feb. 9, 2007.

FIELD OF THE INVENTION

The present invention relates to a method and system for automatically and adaptively determining execution plans for queries with parameter markers.

BACKGROUND OF THE INVENTION

Query optimization is central to the efficient operation of a modern relational database system. The query optimizer is typically invoked every time a new query enters the system. The optimizer identifies an efficient execution plan for the query, based on available database statistics and cost functions for the database operators. In commercial systems, great care has been taken to reduce the overhead of query optimization. However, the task of the optimizer is complex, and the join ordering problem alone has complexity that is exponential in the number of tables [13] (see Appendix A for a list of cited references). As a result, the cost of optimization itself may represent a significant fraction of the elapsed time between query submission and answer generation.

If identical queries are submitted, the database system can cache the optimizer's plan the first time, and avoid reoptimization for subsequent query invocations. The query processor merely has to check for syntactic identity of the query with the cached query. This idea can be generalized to queries with parameters. Constants in the query are replaced with "bind variables" to generate a query template, in which the bind variables are parameters. The query processor can then cache a plan for a query template rather than for a query. As a result, frequently-submitted queries that differ only in the constants can avoid the cost of query optimization. Oracles provides such a facility [1], as do DB2® [17] and Microsoft® SQL Server [10].

There is a potential problem with this approach. A single plan is chosen for all instances of a query template. This plan, while optimal in a particular region of the parameter space, may be sub-optimal in another region. Savings achieved by not invoking the query optimizer may be nullified by the choice of a sub-optimal execution plan. In fact, often the difference in cost between the optimizer's plan and the cached plan exceeds the optimization time.

Modern transaction processing systems are often required to handle thousands of transactions per second. Consider, for example, a web-based Online Transaction Processing (OLTP) application, such as an on-line book store described by the TPC-W benchmark [3]. The system executes canned queries that share a small number of pre-defined templates, such as queries generated by the same HTML form, but differ in parameter values. An interactive system is expected to complete query processing and return results to the user in a short amount of time, often less than a second. A single user's queries may exhibit locality in the values of the submitted parameters, in which case a single query execution plan may be good enough. However, this locality is lost when many users interact with the system at any given time. Therefore, to ensure that an optimal plan is chosen for every query invocation, every instance of the query must be optimized anew. Many of these queries involve joins of several database tables and are thus non-trivial to optimize. In this setting, query optimization performed for every query instance adds significant overhead in terms of the overall execution time and CPU utilization.

A number of Parametric Query Optimization solutions have been proposed. The solution proposed by Ioannidis [13] fails to scale in the number of parameters, and does not directly handle continuous attributes. Geometric solutions proposed by Hulgeri and Sudarshan [12] are impractical because of the exponential explosion in the number of parameters and because they do not perform well with a typical real-life workload having multiple categorical attributes or where the underlying data is highly skewed.

Thus, there exists a need to overcome at least one of the preceding deficiencies and limitations of the related art.

SUMMARY OF THE INVENTION

The present invention provides a computer-based method of automatically and adaptively determining query execution plans for queries having parameter markers, the method comprising:

generating, by a computing system, a first classifier trained by an initial set of training points;

dynamically updating, by a computing system at a first runtime thereof, at least one of a workload of queries processed by a database of the computing system and database statistics collected by the database for computing a plurality of selectivities;

collecting, by a computing system in an off-line phase thereof, the off-line phase being subsequent to the first runtime, a new set of training points, the collecting responsive to a detection of the dynamically updating;

modifying, by the computing system in the off-line phase, the first classifier into a second classifier, the modifying including utilizing the new set of training points;

receiving, by the computing system at a second runtime thereof, the second runtime being subsequent to the off-line phase, a query for the database, the query including one or more predicates, each predicate including one or more parameter markers bound to one or more actual values, and the one or more predicates associated with one or more selectivities of the plurality of selectivities in a one-to-one correspondence; and automatically determining a query execution plan by the computing system, the automatically determining including mapping, by the second classifier, the one or more selectivities into the query execution plan, wherein the query execution plan is included in an augmented set of training points, the augmented set including the initial set and the new set.

A system and a computer program product corresponding to the above-summarized method are also described and claimed herein.

Advantageously, the present invention provides machine learning-based algorithms that automatically and adaptively determine query execution plans for queries having parameter markers. Further, these machine learning-based algorithms accurately model the output of a query optimizer, scale gracefully with the number of query parameters, handle non-linear boundaries in plan space, and achieve high prediction accuracy even when a limited amount of data is available for training.

BRIEF DESCRIPTION OF THE DRAWINGS

FIGS. 8-12 are query templates used in an evaluation of the boosting and random decision tree techniques used in the process of FIG. 2, in accordance with embodiments of the present invention.

FIG. 13 is a table summarizing characteristics of the plan space induced by the optimizer for the query templates of FIGS. 5 & 8-10, in accordance with embodiments of the present invention.

FIG. 14 is a table summarizing the prediction accuracy of the boosting and random decision tree techniques compared to the results of the optimizer that induced the plan space of FIG. 13, in accordance with embodiments of the present invention.

FIG. 15 is a table illustrating a performance improvement provided by the boosting and random decision tree techniques over the results of the optimizer that induced the plan space of FIG. 13, in accordance with embodiments of the present invention.

FIG. 16 is a table comparing the total execution times of queries in FIGS. 5 & 8-10 in a training set according to optimal labeling with execution times according to a re-labeled plan space, in accordance with embodiments of the present invention.

FIG. 17 is a table summarizing the prediction accuracy on the re-labeled plan space for the boosting and random decision tree techniques, in accordance with embodiments of the present invention.

FIG. 18 is a table illustrating a performance improvement in the re-labeled plan space for the boosting and random decision tree techniques, in accordance with embodiments of the present invention.

DETAILED DESCRIPTION OF THE INVENTION

1 Overview

Figure 1:
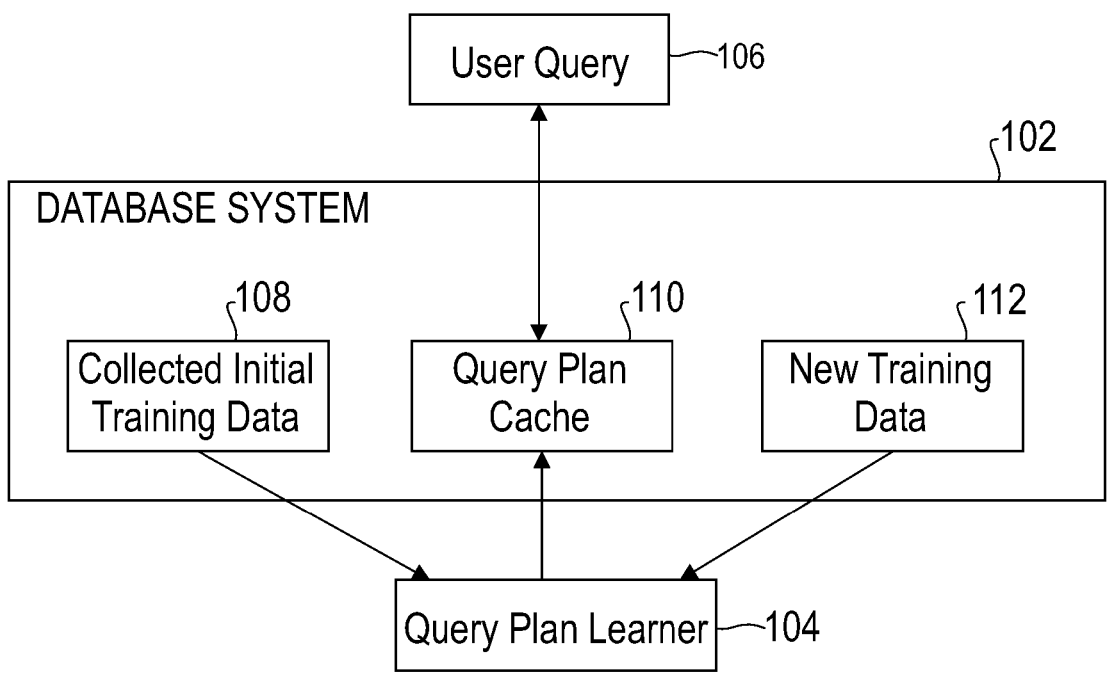
FIG. 1 is a block diagram of a system for automatically and adaptively determining execution plans for queries with parameter markers, in accordance with embodiments of the present invention.

The task of query optimization in modern relational database systems is important but can be computationally expensive. Parametric query optimization (PQO) has as its goal the prediction of optimal query execution plans based on historical results, without consulting the query optimizer. The machine learning techniques disclosed herein accurately model the output of a query optimizer for queries having parameter markers (a.k.a. parametric queries). The algorithms of the present invention scale gracefully with the number of query parameters, handle non-linear boundaries in plan space, and achieve high prediction accuracy even when a limited amount of data is available for training. Both predicted and actual query execution times are used for learning, and the experimental results disclosed herein demonstrate a total net win of a PQO-based method over a state-of-the-art query optimizer for some workloads. The present invention realizes savings not only in optimization time, but also in query execution time, for an over-all improvement by more than an order of magnitude in some cases.

PQO models the distribution of plans chosen in different regions of the parameter space of a query template [12], or of a set of templates [9]. A PQO system is trained off-line using a number of invocations of the query optimizer on instances of the query template. The result of such training is a function that, given an instance of the query parameters, identifies a plan that is likely to be the optimizer's choice. To be useful, this function must execute significantly faster than the optimizer. The function must also have a compact representation, so that a collection of such functions can be managed in memory.

Hulgeri and Sudarshan [14, 15] explicitly construct a geometric subdivision of the parameter space into convex regions corresponding to individual optimal plans. At runtime, when query parameters are known, an appropriate plan is chosen from the plan space. The technique disclosed herein replaces the explicit geometric constructions of [14, 15] with state-of-the-art machine learning techniques that analyze the training data and generate a set of classifiers that map parameter instances to plans.

Compared with earlier geometric approaches, the advantages of using machine learning techniques are: (a) training can be effective with much less training data and (b) the model scales gracefully with the number of parameters. Due to the compactness of the models, classifiers described herein have modest space requirements that are linear in the number of classes, and typically on the order of 10 KB per class. The techniques disclosed herein apply for both qualified and categorical attributes of any datatype. The Experimental Evaluation section presented below demonstrates that the methods disclosed herein accurately predict plans for uniform as well as for skewed data distributions. Further, the experimental results described below demonstrate that the testing functions (i.e., identifying a plan given parameter values) can be performed in less than a millisecond per query, which is typically much cheaper than the cost of query optimization.

The Experimental Evaluation section demonstrates a total net win of the present invention's algorithms compared to either choosing a single plan without reoptimization or reoptimizing each query instance. Both predicted and actual query execution times are used for learning, and achieve an over-all performance improvement by more than an order of magnitude for some workloads.

Moreover, the present invention discloses machine learning-based PQO techniques that are adaptive, so that whenever database statistics or query workload changes, the algorithms of the present invention collect additional training points and use those additional points to modify an old classifier into a new classifier.

2 Problem Formulation

The problem addressed by the present invention is defined in this section.

Definition 2.1. A bind variable is a variable that can appear in a predicate within an SQL WHERE clause. A query template with d parameters is an SQL statement containing d bind variables, each occurring exactly once. Bind variables are ordered according to their occurrence, and named $b_1, \ldots, b_d$ respectively. Herein $\vec{b}$ is used as shorthand for the d-dimensional vector $(b_1, \ldots, b_d)$.

Definition 2.1 does not restrict the data type of parameters (i.e., the parameters may be numeric variables, strings, or even user-defined types). These variables must appear in a WHERE clause. The WHERE clause may belong to the outer query block, or to a nested subquery.

Example 2.1. The following query template has three parameters b1, b2, and b3.

```
Select sum(price) From Orders O1
Where O1.item = :b1 And O1.quantity < :b2 And
    Exists (Select * From Orders O2
        Where O2.item = :b3 And O2.date = O1.date)
```

Definition 2.2. Let Q be a query template with d parameters and let $\vec{p}$ denote a d-dimensional vector of values of the appropriate types for those parameters. A query $Q(\vec{p})$ is the parameter-free SQL statement derived from Q by replacing each bind variable in $\vec{b}$ with the corresponding value from $\vec{p}$.

Parametric query optimization involves finding good plans for many queries that are derived from the same query template. The regular query optimizer's choice of plan is herein referred to as the optimal plan.

Definition 2.3. One is given query template Q, and a set of historical queries $Q(\vec{p}_1), \ldots, Q(\vec{p}_n)$ derived from Q according to some distribution of values $\vec{p}_i$. For each query $Q(\vec{p}_i)$, suppose that the optimal plan is $P_i$. The set of queries and their corresponding plans is called the training set, and n is the size of the training set. A training set (a.k.a. training dataset) includes items referred to herein synonymously as training data, training data points, training points and training examples.

A parametric query optimizer (PQO) has an off-line phase and an on-line phase. During the off-line phase, the PQO may read the training set and database statistics to generate some additional information I that is cached by the database. During the on-line phase, the PQO is given a previously unseen query derived from Q using the same parameter distribution that was used in the training set. The PQO is required to choose a valid plan for that query based on the current database statistics and I, but not the training set. The PQO is correct if the chosen plan is the optimal plan for the query. The PQO is permitted to return no plan, which means that it cannot identify the optimal plan with sufficient confidence.

As used herein, database statistics include summary information of a database table such as the number of rows that are in the table, the number of distinct values included in a particular column, the counts for each of those distinct values and the most frequent value of those distinct values, as well as histograms and other summary statistics related to a column or column pairs. Database statistics are used to compute the selectivity of a predicate. Selectivities change as a result of a change in database statistics, which in turn are caused by an update to one or more database tables.

An extended parametric query optimizer (EPQO) operates on an extended training set that contains the set of optimal plans chosen by the optimizer for the queries in the training set, and, for each query, the actual execution time according to each optimal plan. The goal of the EPQO is to choose the plan with the smallest actual execution time.

When the on-line phase returns a plan, the database system typically executes that plan without explicitly calling the regular query optimizer for the query. When no plan is returned, the database system will either optimize the query using the regular query optimizer, or use some standard default plan. A parametric query optimizer can be measured according to several metrics:

- The time to generate I from the training set is called the training time. Since this is an off-line process, the training time does not have to be "interactive."
- The size of I represents the amount of space needed to be kept on-line by the database system to enable the PQO to optimize instances of a query template.
- The time taken during the on-line phase to identify a plan for a given vector of parameter values. Since the aim of PQO is to save the time taken by the regular query optimizer, this measure should be substantially faster than the regular query optimizer itself.
- The on-line phase has three possible outcomes: correct plan, incorrect plan, and no plan. Note that the penalties for an incorrect plan and for no plan may be different. Measurements may include the extra time involved when a suboptimal plan is executed and the extra time needed if the regular query optimizer is invoked.

These metrics may vary depending on the size of the database, the available statistics and access structures, the query template, the distribution of points in the parameter space, and the size of the training set.

While it is possible that there may be changes in database statistics between the off-line and on-line phases of the PQO, it is hereinafter assumed that the statistics remain valid between phases. This is a fair assumption if off-line training is performed sufficiently regularly (e.g., each time the statistics themselves are recomputed).

In one embodiment, parametric query optimization is performed on the parameter values themselves. In a preferred embodiment, parametric query optimization instead uses as inputs the selectivities of the predicates involving those parameters, for the following reasons:

1. The underlying query optimizer bases its decisions on predicate selectivities, and not on any special property of values in the domain.
2. The existing query optimizer can be leveraged to derive selectivity estimates, which are available for inspection after query optimization. Further, such estimates are available cheaply from the existing database statistics structures during the on-line phase.

3. The approach does not need to be aware of the data types being used, and is applicable to any data type as long as the underlying database system can estimate predicate selectivities. User-defined data types already need to provide selectivity estimation code if they want their types to be optimizable.

4. Different data values may map to the same selectivity measure. Using selectivity measures instead of actual values reduces the cardinality of the space and is the first step toward abstracting raw data into a model.

As used herein, a selectivity is defined as a property of a predicate of a database query. For example, a predicate that is a condition in a WHERE clause is applied to a table. In this example a selectivity indicates the percentage of rows of the table that satisfy the condition. Given binding values of parameter markers within a predicate of a query, selectivities can be computed for that predicate.

In the event that two columns of a table are correlated, the selectivities of two predicates will not be independent. This is a well-known problem in query optimization. One solution to this problem is to keep multidimensional statistics on combinations of columns, and to use these statistics for query optimization [14]. A similar approach applies to parametric query optimization by identifying groups of correlated predicates, and estimating a single combined selectivity for the correlated predicates, which would then be an additional input to the on-line and off-line phases. Hereinafter, the description of parametric query optimization uses single-predicate selectivities only.

3 Machine Learning Background

Machine Learning is the study of computer algorithms that improve automatically through experience. Recent developments in this field have shown wide applicability of machine learning techniques [2, 7, 20].

A classifier is a computational procedure for deciding which among a number of classes an object belongs to, based on the object's properties (a.k.a. solving a classification problem). A binary classifier has two classes: the positive examples and the negative examples. In a classification problem, objects are represented as labeled feature vectors $\{(\vec{x}_i, y_i)\}$ generated from a target true function $y=F(\vec{x})$, where $\vec{x}_i=(x_1, x_2, \ldots, x_k)$ is a list of features, and $y_i \in Y$ is the class label. In the machine learning approach for parametric query optimization in the present invention, the feature vector is a list of selectivity measures corresponding to the binding values for a query template, and labels are plans provided by the query optimizer. The task of inductive learning is to construct a model $y=f(\vec{x})$ to approximate the true function F.

In the interest of replacing the query optimizer function F with an inductive model $f$, the present invention discloses modeling techniques that are accurate in their prediction, and efficient in computation and in memory consumption during both model construction and query plan prediction phases.

Error of a machine learning algorithm can be decomposed into bias, variance, and noise, which are discussed in the remainder of this section.

There is no noise in the problem defined in Section 2. It is assumed that the query optimizer function F is deterministic: given the same set of parameter selectivities for a particular query template, the query optimizer will always return the same plan.

To achieve high accuracy, an algorithm is described herein that produces a function $f$ that closely approximates the true function F. Such an algorithm is said to have low bias or systematic error. Several machine learning techniques were excluded because of high bias. Regression techniques predict continuous values and are inappropriate for the present invention's domain in which there are clear discontinuities because the space of plan labels is discrete. The traditional single decision tree algorithm uses linear boundaries and is excluded from this study since the true decision boundary is non-linear in general. A wide variety of clustering algorithms is described in the machine learning literature. Clustering is typically used in unsupervised learning, where class labels are not available. However, PQO is a supervised learning problem—class labels are the query execution plans.

The final consideration is the effect of a small number of training examples on variance. One way to reduce variance is to construct multiple uncorrelated models and combine their predictions via some form of voting [21]. In this work, two algorithms are implemented, each using a different voting method, and compare their accuracy: AdaBoost [20] weighs the training data and constructs multiple classifiers from each weighted sample, while Random Decision Trees [6] utilize a randomization approach during model construction.

Experiments with other machine learning algorithms yielded limited success. Support Vector Machines (SVM) [22] proved to be sensitive to the geometric shape of the plan space, and required kernel selection and parameter tuning for each query. The Naive Bayes classifier works with discrete parameters and is very efficient during training. However, the Naive Bayes classifier also required tuning for each query because it was sensitive to the discretization: the way continuous features were mapped into buckets.

3.1 AdaBoost

Boosting is a general and provably effective method for improving the accuracy of any learning algorithm. AdaBoost [8] is a widely accepted boosting algorithm that can improve the accuracy of a collection of "weak" learners and produce an arbitrarily accurate "strong" learner. The weak learners are required to be only slightly better than random guessing (i.e., more than 50% accurate in the case of binary classification). AdaBoost was extended in [20] to handle confidence-rated predictions, where weak learners output both the predicted label and a confidence measure as their classification hypothesis.

AdaBoost calls each weak learner repeatedly in a series of rounds $t=1, \ldots, T$. There are various ways to choose T, and one way is described in Section 4.3. The main idea of the AdaBoost algorithm of the present invention is to maintain a distribution of weights over the training set. Initially, the weights of all points are equal. On round t, each weak learner is measured by its error $\epsilon_t$. The error is the sum of weights of (a) mis-classified points weighted by the confidence rating c of the prediction, and (b) correctly classified points weighted by 1−c. The weak learner with the lowest error is chosen and is herein referred to as $W_t$. The weights of $W_t$'s incorrectly classified examples are exponentially increased, and the weights of $W_t$'s correctly classified examples are exponentially decreased. In this way, the weak learners are forced to focus on the difficult examples in the training set. The process is repeated with the new weights. The final strong hypothesis H is the $\alpha_t$-weighted majority vote of $W_1, \ldots, W_T$, where $$\alpha_t = \ln\left(\frac{1-\varepsilon_t}{\varepsilon_t}\right).$$

AdaBoost has provable bounds on generalization error (i.e., the error on unseen examples that come from the same distribution as the training examples).

AdaBoost is a binary classifier, while PQO is a multi-class problem. The basic AdaBoost algorithm has been extended to incorporate multi-class classification, and is known as Ada-Boost.M2 [7]. The AdaBoost.M2 algorithm was implemented but failed to achieve fast convergence. The present invention therefore utilizes an alternative way to adapt Ada-Boost to multi-class problems.

The simplest way to adapt a binary classifier to a multi-class problem is by using the "one-vs-all" approach, where a single classifier is built for every class. One-vs-all classification, while simple, is often unable to provide adequate prediction accuracy. There is no classification confidence measure, and if a point is classified positively by more than one classifier, no mechanism exists to break the tie.

The use of error-correcting output codes (ECOC) can improve prediction accuracy of binary one-vs-all classifiers on multi-class problems [5]. An ECOC is a matrix of binary values such as the matrix shown in Table 1. The length of the code is the number of columns in the matrix, and the number of rows corresponds to the number of classes in the learning problem. A single binary classifier (e.g., AdaBoost), is trained for each column in the matrix, with points from classes that have a 1 in the corresponding entry serving as positive examples, and those from classes with a 0 entry as negative examples. During testing, the incoming example is evaluated by every binary classifier, and a bit-string of classification outcomes is obtained. This string is then compared to every row in the matrix, and the Hamming distance (i.e., the number of bits that differ) is calculated. The point is assigned to the class closest in terms of Hamming distance. There is a trade-off between the improvement in prediction accuracy and training time: a greater Hamming distance can be achieved for longer codes, but more binary classifiers need to be trained.

TABLE 1

| Class | 1 | 2 | 3 | 4 | 5 | 6 | 7 |
|---|---|---|---|---|---|---|---|
| 1 | 1 | 1 | 1 | 1 | 1 | 1 | 1 |
| 2 | 0 | 0 | 0 | 0 | 1 | 1 | 1 |
| 3 | 0 | 0 | 1 | 1 | 0 | 0 | 1 |
| 4 | 0 | 1 | 0 | 1 | 0 | 1 | 0 |

3.2 Random Decision Trees

A decision tree is a classifier with a hierarchy of decisions made at each node of the tree. One traverses the tree from root to leaf, choosing the appropriate child based on the decision criterion coded into each node. For example, a node has children for different ranges of the selectivity of the first predicate of a query template.

The Random Decision Tree (RDT) method constructs multiple decision trees "randomly." The construction selects a feature at random from among those features not yet used in higher levels of the tree. In one embodiment, a feature of the RDT method is a predicate selectivity. A partitioning value for that feature is also selected at random from a distribution. Training data points from the node are then distributed to the node's children. Construction stops when the depth reaches a certain limit, when the number of data points in a node is sufficiently small, or when all points in a node have the same label (i.e., the node is a pure node). The randomized construction is unlike traditional single decision tree algorithms (e.g., C4.5 and ID3 [18]) that use gain functions to choose features and thresholds for tree nodes.

During the on-line phase, each tree is traversed using the actual query selectivities, to arrive at a leaf node L containing a number of plans. A posterior probability is calculated for each plan P. This probability is simply the proportion of the training points in L that are labeled with P. The posterior probabilities are averaged across all trees, and the plan with the highest average is output.

The RDT method reliably estimates probabilities, closely approximates non-linear boundaries, and reduces variance when the number of training examples is small [6].

4 Applying AdaBoost and Random Decision Trees

This section describes the application of AdaBoost and Random Decision Trees to parametric query optimization. Hereinafter, the PQO techniques disclosed herein that apply AdaBoost and RDT are referred to collectively as the algorithms of the present invention. The algorithms of the present invention were implemented on top of an off-the-shelf commercial relational database system, and require no modifications to the query optimizer or any other part of the database system.

FIG. 1 is a block diagram of a system for automatically and adaptively determining execution plans for queries with parameter markers, in accordance with embodiments of the present invention. System 100 includes a database system 102, a query plan learner 104 (a.k.a. query plan classifier), and a user query 106. Database system 102 includes collected initial training data points 108, a query plan cache 110 and new training data points 112. Database system 102 is a relational database system that includes a query optimizer (not shown).

Figure 2:
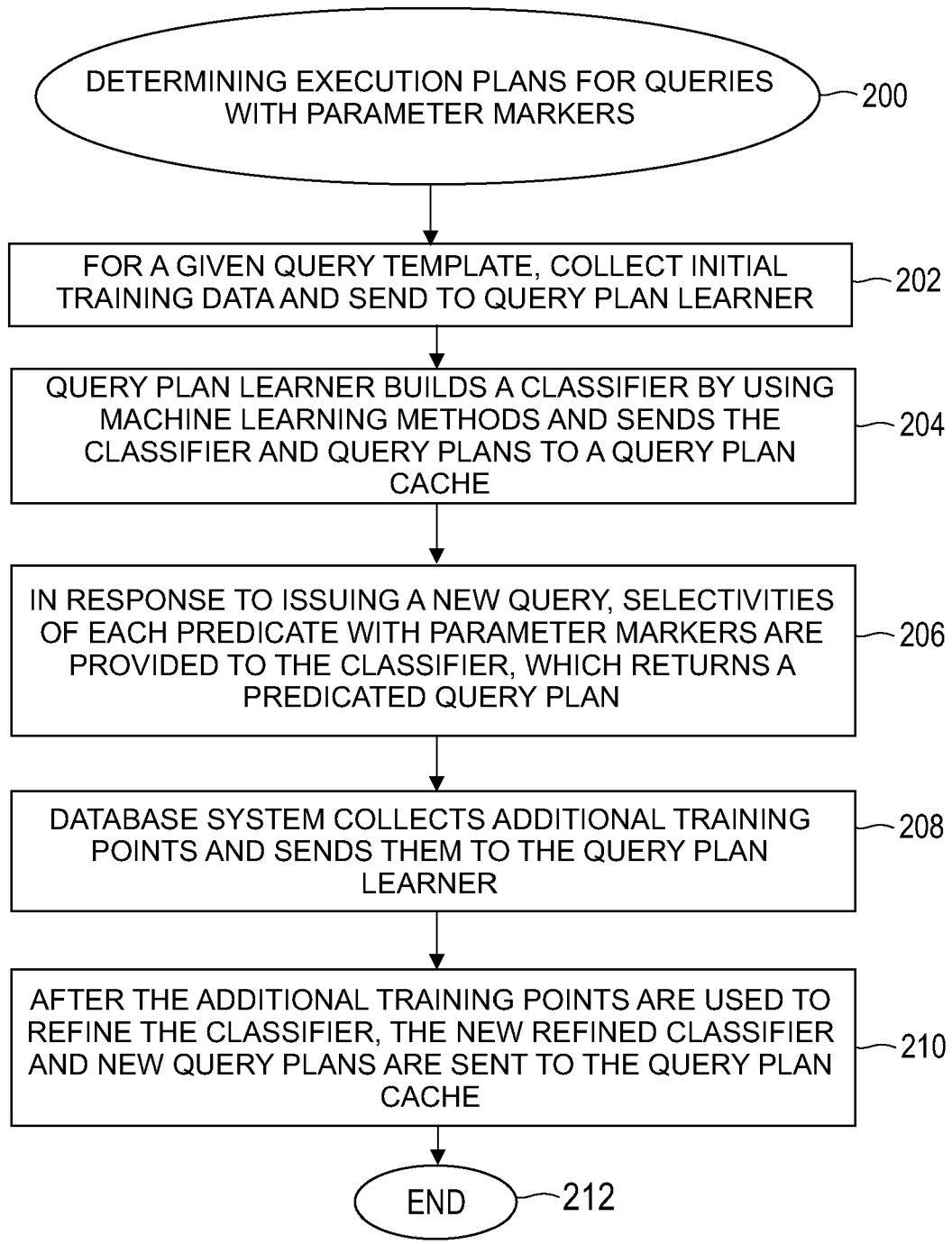
FIG. 2 is a flow chart of a process of automatically and adaptively determining execution plans for queries with parameter markers in the system of FIG. 1, in accordance with embodiments of the present invention.

FIG. 2 is a flow chart of a process of automatically and adaptively determining execution plans for queries with parameter markers in the system of FIG. 1, in accordance with embodiments of the present invention. The process of FIG. 2 begins at step 200. In step 202, for a given query template, initial training data 108 is collected and sent by database system 102 (see FIG. 1) to query plan learner 104 (see FIG. 1). A training point in the initial training data consists of all selectivities of each predicate with parameter markers and a chosen query execution plan as the class label. In step 204, query plan learner 104 (see FIG. 1) builds a classifier by using machine learning techniques and sends the classifier and query execution plans to query plan cache 110 (see FIG. 1). The machine learning techniques are based on boosting or random decision tree techniques, which are described below in subsequent sections.

In step 206, a new user query 106 is issued and received by query plan cache 110. The selectivities of each predicate with parameter markers are given as input to the classifier built in step 204. Using the selectivities as input, the classifier outputs a predicted query execution plan. In step 208, database system 102 (see FIG. 1) collects extra training points 112 (see FIG. 1) and sends them to query plan learner 104 (see FIG. 1). In step 210, extra training points 112 (see FIG. 1) are used to refine the classifier built in step 204. The newly refined classifier and the new query execution plans are sent from query plan learner 104 (see FIG. 1) to query plan cache 110 (see FIG. 1). In one embodiment, after step 210 is complete and a new query is received, the process loops back to step 206 to start processing the new query. The process of FIG. 2 ends at step 212.

Steps 202 and 204 are performed in a first off-line phase (i.e., not at runtime). Step 206 is performed at runtime. Steps 208 and 210 provide the adaptive capabilities of the present invention in a second off-line phase. The second off-line phase is shorter than the first off-line phase because the required training in the second off-line phase is incremental and trains only the new training data points 112 (see FIG. 1). For example, if the database changes and those changes result in an update of database statistics, then the query plan cache is deactivated and the database optimizer is allowed to work for additional rounds on new user queries received at runtime by database system 102 (see FIG. 1), so that new data points 112 (see FIG. 1) are obtained that reflect the database changes. The new user queries include binding values that are sent as input to the classifier built in step 204. These new training data points that reflect the database changes are sent in an off-line phase to query plan learner 104 (see FIG. 1) in step 208. After the query plan learner uses the new training points to generate a new, refined classifier, the new classifier and the new query execution plans associated with the new classifier are sent in the off-line phase to query plan cache 110 (see FIG. 1) in step 210.

4.1 Overview of AdaBoost Processes

This section presents an overview of the processes of building, using and adapting an AdaBoost-based classifier for the PQO technique of the present invention. Unless otherwise specified, the steps in each of these processes are performed by query plan learner 104 (see FIG. 1).

4.1.1 Building a Multi-Class Classifier Using Boosting

Figure 3A:
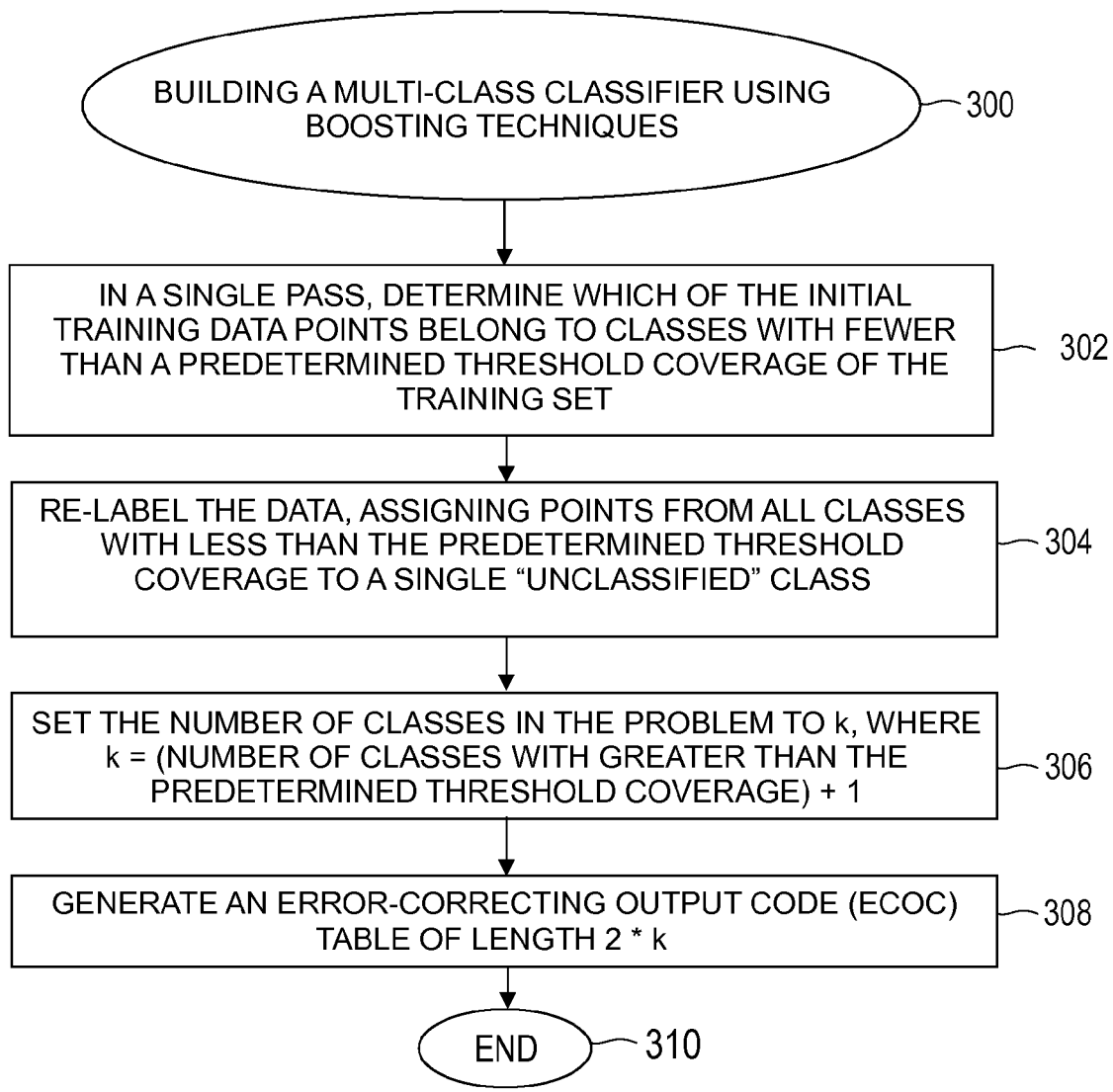
FIG. 3A is a flow chart of a process of building a multi-class classifier using boosting techniques within the process of FIG. 2, in accordance with embodiments of the present invention.

FIG. 3A is a flow chart of a process of building a multi-class classifier using boosting techniques within the process of FIG. 2, in accordance with embodiments of the present invention. The multi-class classifier building process of FIG. 3A begins at step 300. In a single pass in step 302, the query plan learner determines which of the initial training data points belong to classes with less than a predetermined threshold coverage (e.g., 5% coverage) of the training set. In step 304, the training data is re-labeled, assigning training points from all classes with less than the predetermined threshold coverage to a single "unclassified" class.

In step 306, the number of classes in the problem is set to k, where k=(number of classes with greater than the predetermined threshold coverage)+1. Step 308 generates an ECOC table having a length of 2*k. The classifier building process of FIG. 3A ends at step 310.

Figure 3B:
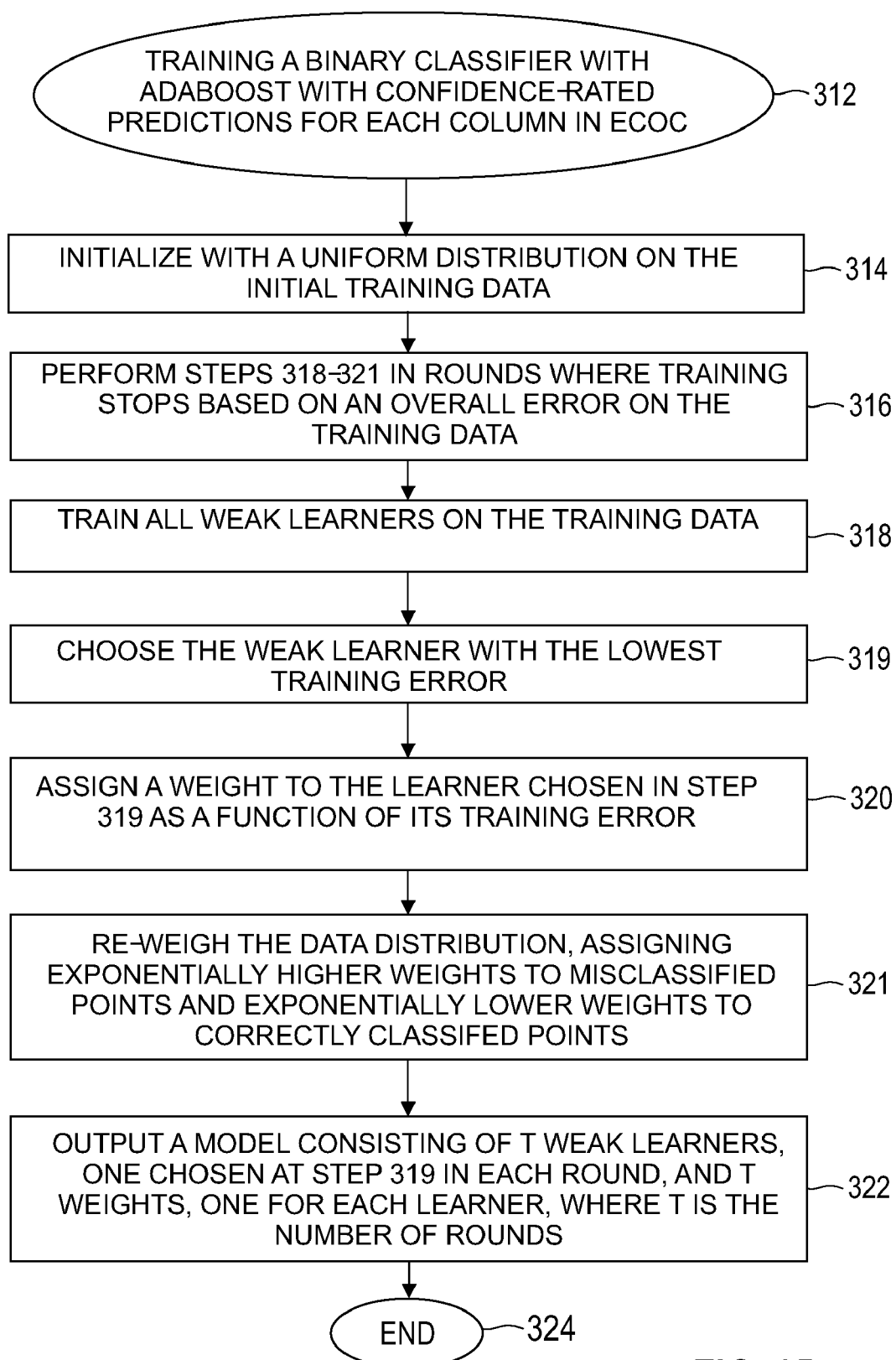
FIG. 3B is a flow chart of a process of training a binary classifier with AdaBoost within the process of FIG. 2, in accordance with embodiments of the present invention.

4.1.2 Training a Binary Classifier with AdaBoost with Confidence-Rated Predictions FIG. 3B is a flow chart of a process of training a binary classifier with AdaBoost with confidence-rated predictions [20] for each column in an ECOC table within the process of FIG. 2, in accordance with embodiments of the present invention. The binary classifier training process of FIG. 3B begins at step 312. In step 314, the training data points are initialized with equal weights. The training data points in this section refer to the augmented set of training points that include the initial training data 108 (see FIG. 1) and new training data 112 (see FIG. 1). Step 316 indicates that steps 318-321 comprise a training phase performed in rounds where training stops based on an overall training data error computation. Determining the number of rounds is described below. In step 318, all weak learners are trained on the training data points. In step 319, the weak learner with the lowest training error is chosen. In step 320, a weight is assigned to the learner chosen in step 319. The weight assigned in step 320 is a function of the chosen learner's training error. In step 321, the data distribution of the training data is re-weighted, assigning exponentially higher weight to mis-classified examples, and exponentially lower weight to correctly classified examples.

The determination of the number of rounds for the training phase includes computing the overall error on the training data every X rounds, where X is predetermined (e.g., X=20 rounds). If the computed error is below a predetermined rate (e.g., 5%), then the training phase stops. If the error is above the predetermined rate, then the training continues for another X rounds. If the error is the same as it was X rounds ago, then training stops. If the error is higher than it was X rounds ago, then the algorithm rolls back to the state X rounds ago, and training stops.

In step 322, the model is output. If T is the number of training rounds in the training phase of steps 318-321, then the model consists of T weak learners and T weights, one weight for each weak learner. Each of the T weak learners is chosen at step 319 in one of the rounds of training. Each of the T weights is assigned at step 320 in one of the training rounds. The binary classifier training process of FIG. 3B ends at step 324.

4.1.3 Classification Procedure Using Boosting

Figure 3C:
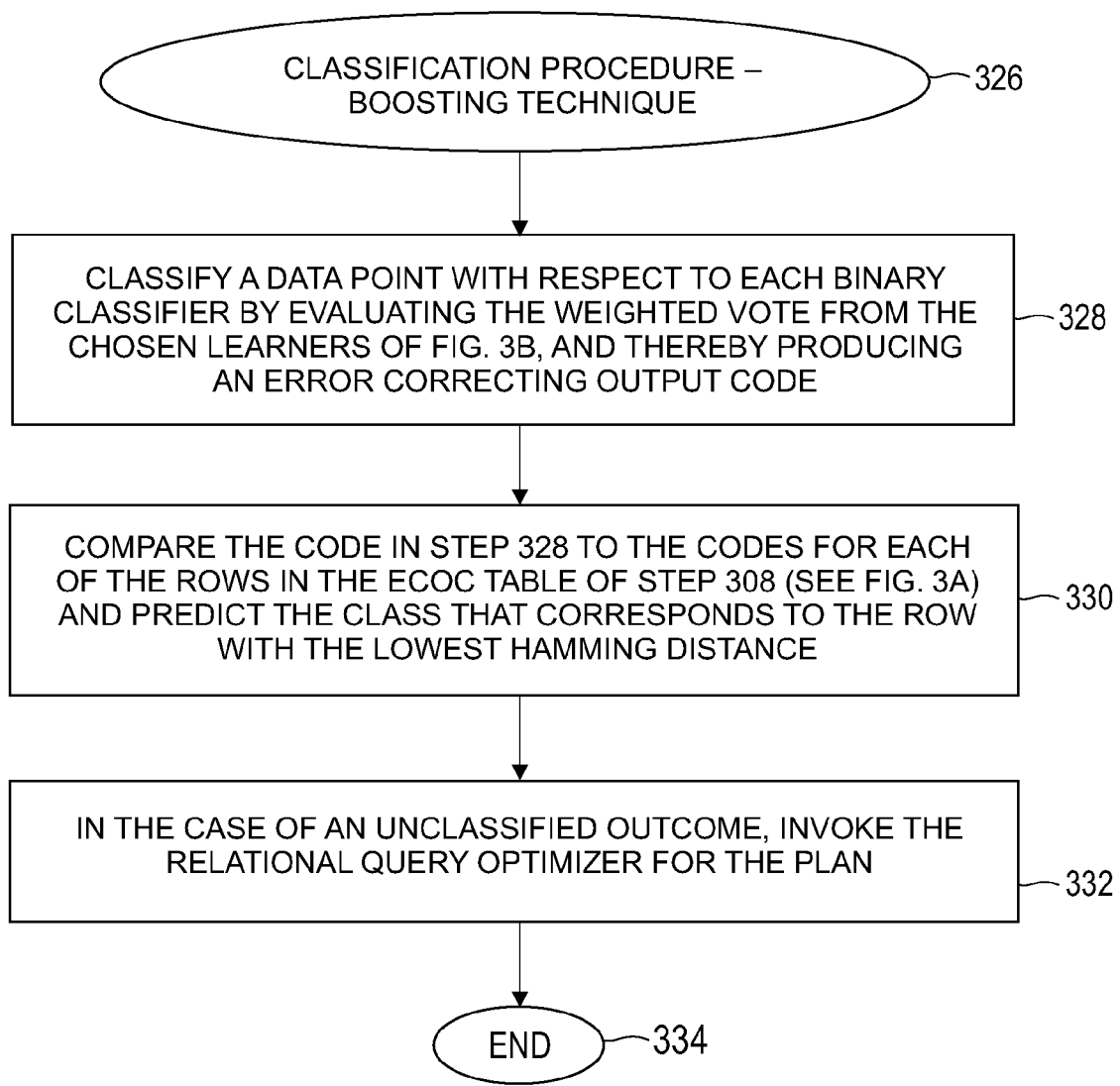
FIG. 3C is a flow chart of a classification procedure using a boosting technique within the process of FIG. 2, in accordance with embodiments of the present invention.

FIG. 3C is a flow chart of a classification procedure using a boosting technique within the process of FIG. 2, in accordance with embodiments of the present invention. The boosting-based classification process starts at step 326. In step 328, a training data point is classified with respect to each binary classifier by evaluating a weighted vote from the learners chosen in FIG. 3B. Step 328 produces an error-correcting output code. In step 330, the error-correcting output code of step 328 is compared to the codes for each of the rows in the ECOC table of step 308 (see FIG. 3A). Step 330 then predicts the class that corresponds to the ECOC row with the lowest Hamming distance. In step 332, if the outcome of the classification in step 330 is an "unclassified" class, then the query optimizer of database system 102 (see FIG. 1) is invoked for the query execution plan. The classification process of FIG. 3C ends at step 334.

4.1.4 Adapting to Workload Changes Using Boosting

Figure 3D:
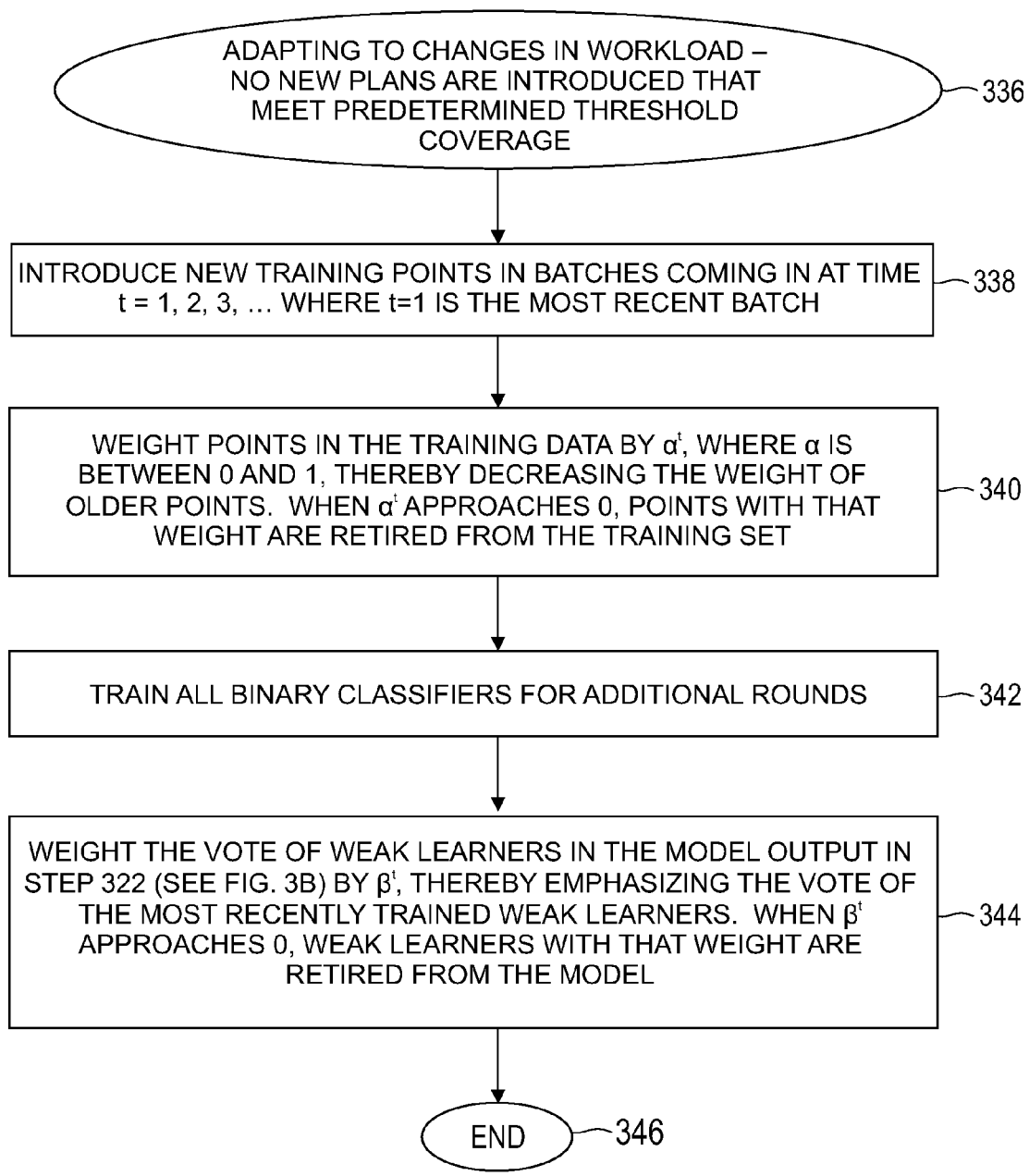
FIGS. 3D-3F are flow charts of processes of adapting to changes in workload in the process of FIG. 2, in accordance with embodiments of the present invention.
Figure 3E:
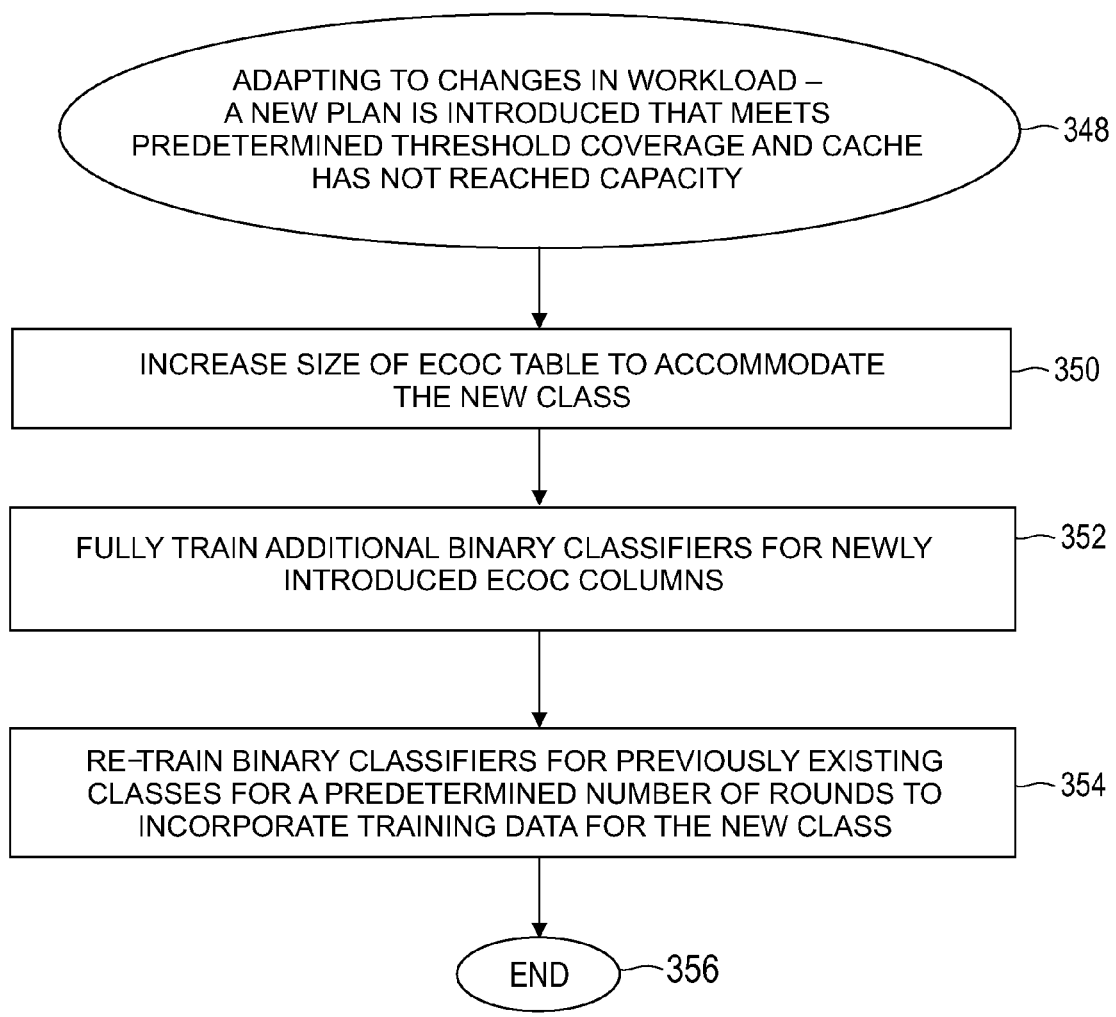
Figure 3F:
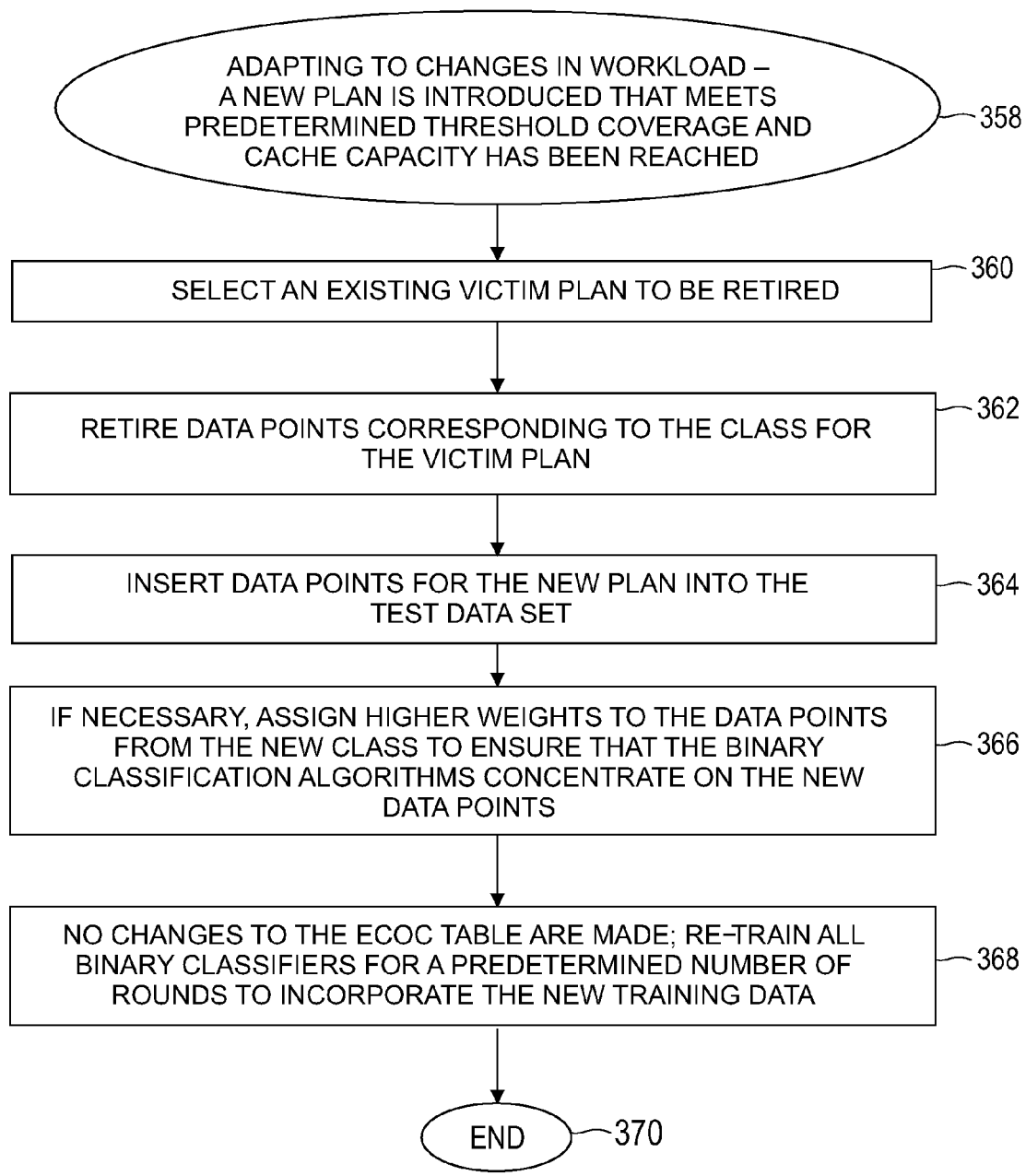

FIGS. 3D-3F are flow charts of processes of adapting to changes in workload in the process of FIG. 2, in accordance with embodiments of the present invention. In the workload change adaptation process of FIG. 3D, the query workload of database system 102 (see FIG. 1) changes but no new query execution plans are introduced that meet the predetermined threshold coverage (e.g., 5%). The adaptation process of FIG. 3D begins at step 336. In step 338, new training points 112 (see FIG. 1) are introduced in batches coming in at time t, where t is a range of integers where the lowest integer indicates the most recent batch. In one embodiment, t=1, 2, 3, . . . where t=1 is the most recent batch.

In step 340, the new training data points 112 (see FIG. 1) are weighted by $\alpha^t$, where $\alpha$ is between 0 and 1, thereby decreasing the weight of older training data points in the augmented set of training points (i.e., initial training points 108 and new training points 112 of FIG. 1). When $\alpha^t$ approaches 0 (i.e., differs from 0 by less than a predefined amount associated with $\alpha^t$), training points with that $\alpha^t$ weight are retired from the augmented training set. In step 342, all binary classifiers are trained for a predefined number of additional rounds. In step 344, each vote of the weak learners in the model output in step 322 (see FIG. 3B) is weighted by $\beta^t$, where $\beta$ is between 0 and 1, thereby emphasizing the vote of the most recently trained weak learners. When $\beta^t$ approaches 0 (i.e., differs from 0 by less than a predefined amount associated with $\beta^t$), weak learners with that $\beta^t$ weight are retired from the model. The adaptation process of FIG. 3D ends at step 346.

In the workload change adaptation process of FIG. 3E, the query workload of database system 102 (see FIG. 1) changes and a new query execution plan is introduced that meets the predetermined threshold coverage (e.g., 5%). The capacity of query plan cache 110 has not been reached and therefore it is not necessary to retire an existing query execution plan to accommodate the new query execution plan. The adaptation process of FIG. 3E begins at step 348. In step 350, the size of ECOC table is increased to accommodate the new class (i.e., an ECOC table with k classes is increased to an ECOC table with k+1 classes). The previous ECOC with k classes is a subset of the size-increased ECOC table with k+1 classes. In step 352, additional binary classifiers are fully trained for the ECOC table columns that are newly introduced in step 350. In step 354, the binary classifiers from previously existing classes are re-trained for a predetermined number of rounds (i.e., are not fully trained) to incorporate the new training data. The adaptation process of FIG. 3E ends at step 356.

In the workload change adaptation process of FIG. 3F, the query workload of database system 102 (see FIG. 1) changes and a new query execution plan is introduced that meets the predetermined threshold coverage (e.g., 5%). In this case, the capacity of query plan cache 110 has been reached prior to the introduction of the new query execution plan, and therefore it is necessary to retire an existing query execution plan to accommodate the new query execution plan. The adaptation process of FIG. 3F begins at step 358. In step 360, an existing victim query execution plan is selected to be retired. In step 362, data points that correspond to the class for the selected plan are retired from the test data set. In step 364, data points for the new query execution plan are inserted into the test data set.

If necessary based on predefined criteria, data points from the new class are assigned higher weights in step 366 to ensure that the binary classification algorithms concentrate on the new data points. In step 368, no changes to the ECOC table are made and all binary classifiers are re-trained for a predetermined number of rounds (i.e., are not fully trained) to incorporate the new training data. The adaptation process of FIG. 3F ends at step 370.

4.1.5 Building Weak Learners

Figure 3G:
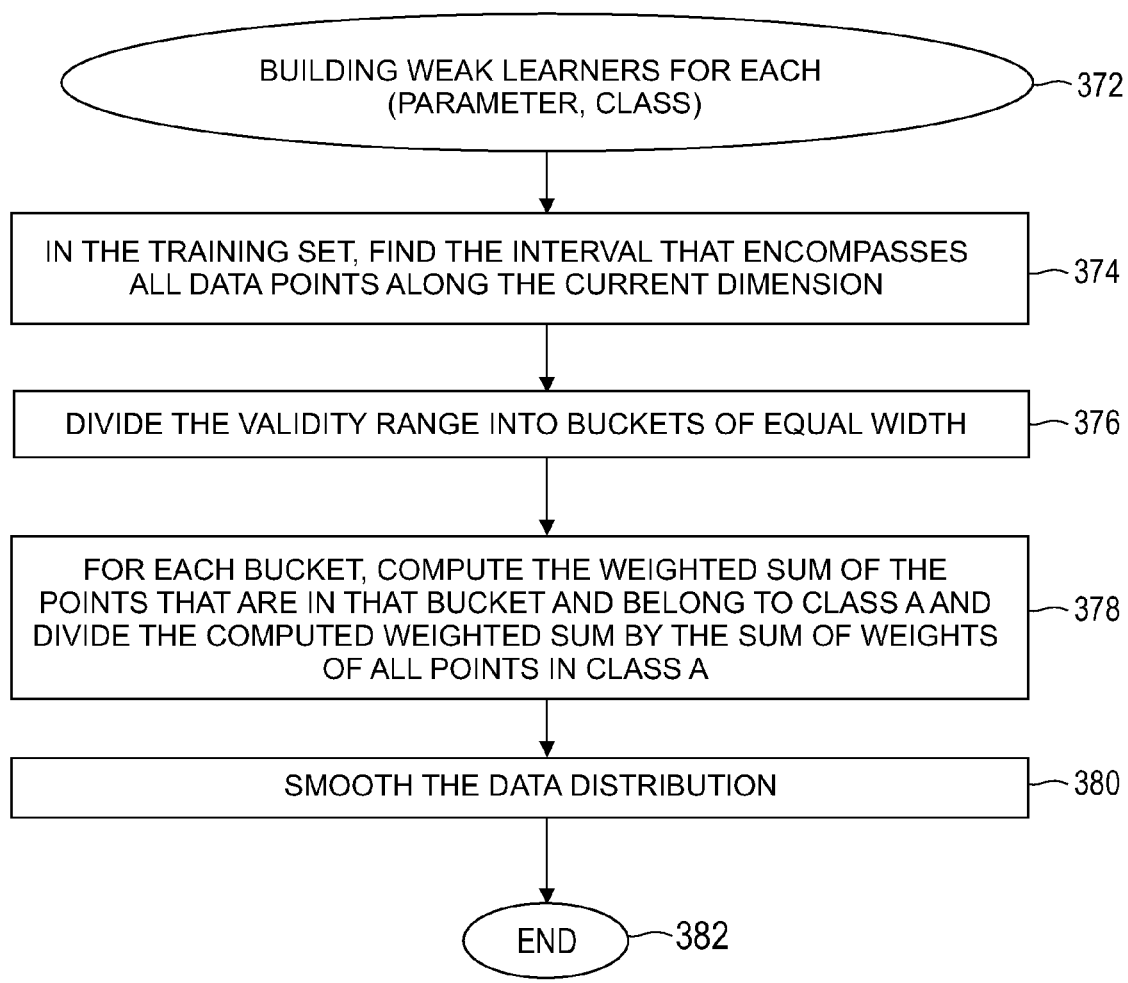
FIG. 3G is a flow chart of a process of building weal, learners in the process of FIG. 3B, in accordance with embodiments of the present invention.

FIG. 3G is a flow chart of a process of building weak learners in the process of FIG. 3B, in accordance with embodiments of the present invention. The weak learner building process of FIG. 3G begins at step 372. This process uses the conditional probabilities of a query execution plan given a parameter range as a weak learner. Weak learners of FIGS. 3B and 3C are unary classifiers. There are (number of classes)* (number of dimensions) weak learners per binary classifier. The probabilities are weighted by the current weights of the data points in the training set. Weak learners for each (parameter, class) are built by the following four steps. In the training set, the interval that encompasses all training data points along the current dimension is found in step 374. In step 376, the validity range is divided into buckets of equal width. For each bucket of step 376, the weighted sum of the data points that are in that bucket and belong to class A is computed in step 378. In step 380, the data distribution is smoothed. The weak learner building process ends at step 382.

When deciding whether class A or class B is more likely on a single dimension d, weak learners for A_d and B_d are queried, and both return a probability. The class with the highest probability is chosen and the winning probability is returned as the weight of the hypothesis.

4.2 Overview of RDT Processes

This section presents an overview of the processes of building, using and adapting a RDT-based classifier for the PQO technique of the present invention.

4.2.1 Building a Multi-Class Classifier Using RDT

Figure 4A:
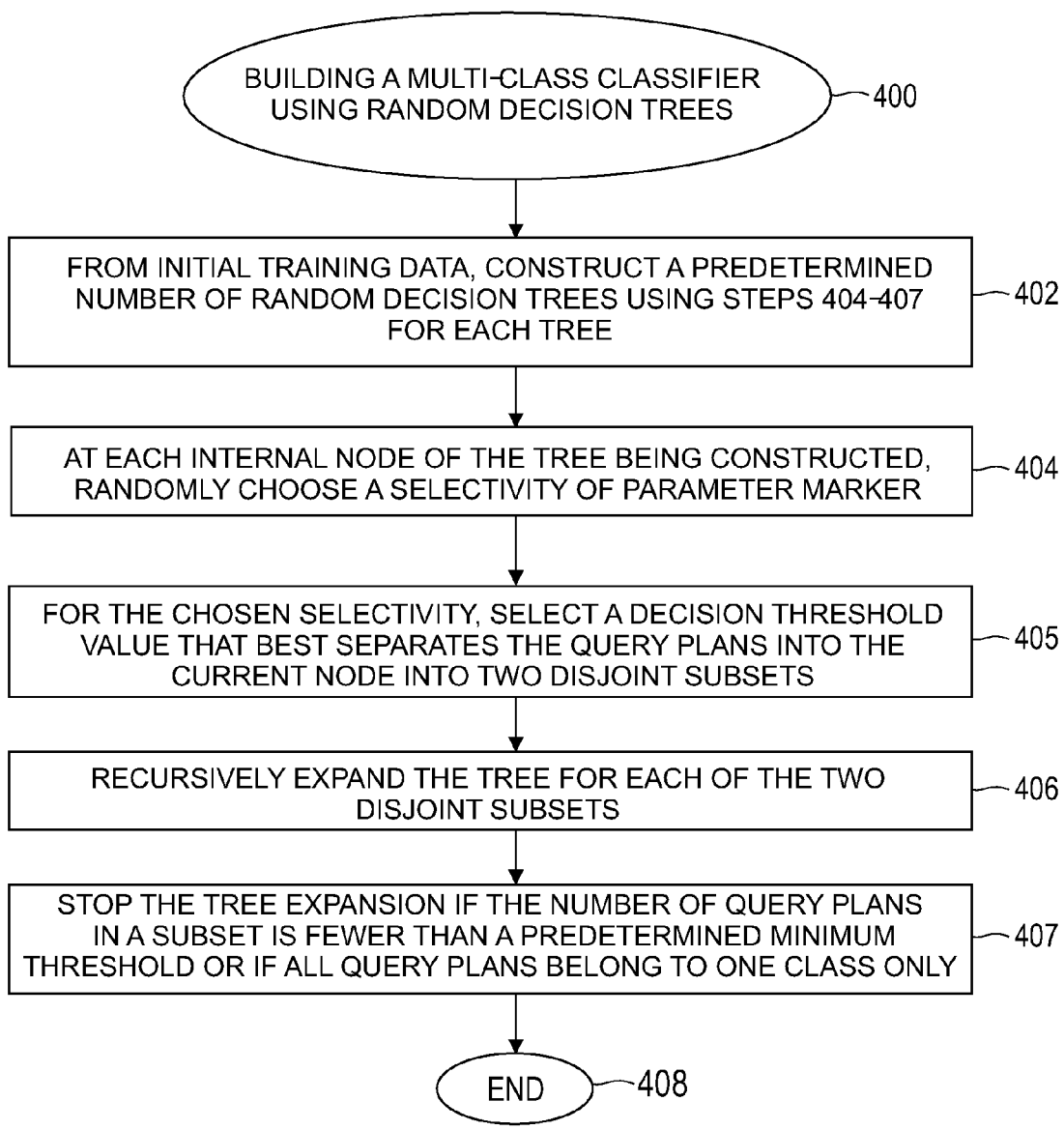
FIG. 4A is a flow chart of a process of building a multi-class classifier using random decision trees in the process of FIG. 2, in accordance with embodiments of the present invention.

FIG. 4A is a flow chart of a process of building a multi-class classifier using random decision trees in the process of FIG. 2, in accordance with embodiments of the present invention. The process for building a multi-class classifier using RDTs begins at step 400. As used herein, an RDT is a directed acyclic graph with a single root, each internal node of the RDT tests a selectivity measure, and each leaf node of the RDT is a collection of query execution plans. In step 402, a procedure begins which is performed by query plan learner 104 (see FIG. 1) and which is for constructing a predetermined number of RDTs from initial training data 108 (see FIG. 1). This RDT construction procedure uses steps 404-407 for each RDT being constructed. For example, the predetermined number of RDTs is 10.

In step 404, at each internal node of the current RDT being constructed, query plan learner 104 (see FIG. 1) randomly chooses a selectivity of a parameter marker. The chosen selectivity is not used in a higher level node of the current RDT's hierarchy. In step 405, for the chosen selectivity, a decision threshold value is selected. The selected decision threshold value optimally separates the query execution plans in the current node of the RDT into two disjoint subsets. In step 406, the RDT construction procedure is recursively used to expand the current RDT for each subset of the aforementioned two disjoint subsets. The recursive expansion continues in step 407 until (1) a number query execution plans in one of the two disjoint subsets is fewer than a predefined minimum query execution plan threshold (e.g., 3 query execution plans), (2) a depth of the current RDT reaches a depth threshold based on predefined criteria (e.g., the tree depth is limited to 5 times the number of features), or (3) all query execution plans of a subset of the two disjoint subsets belong to a single type. The building process of FIG. 4A ends at step 408.

4.2.2 Classification Procedure Using RDTs

Figure 4B:
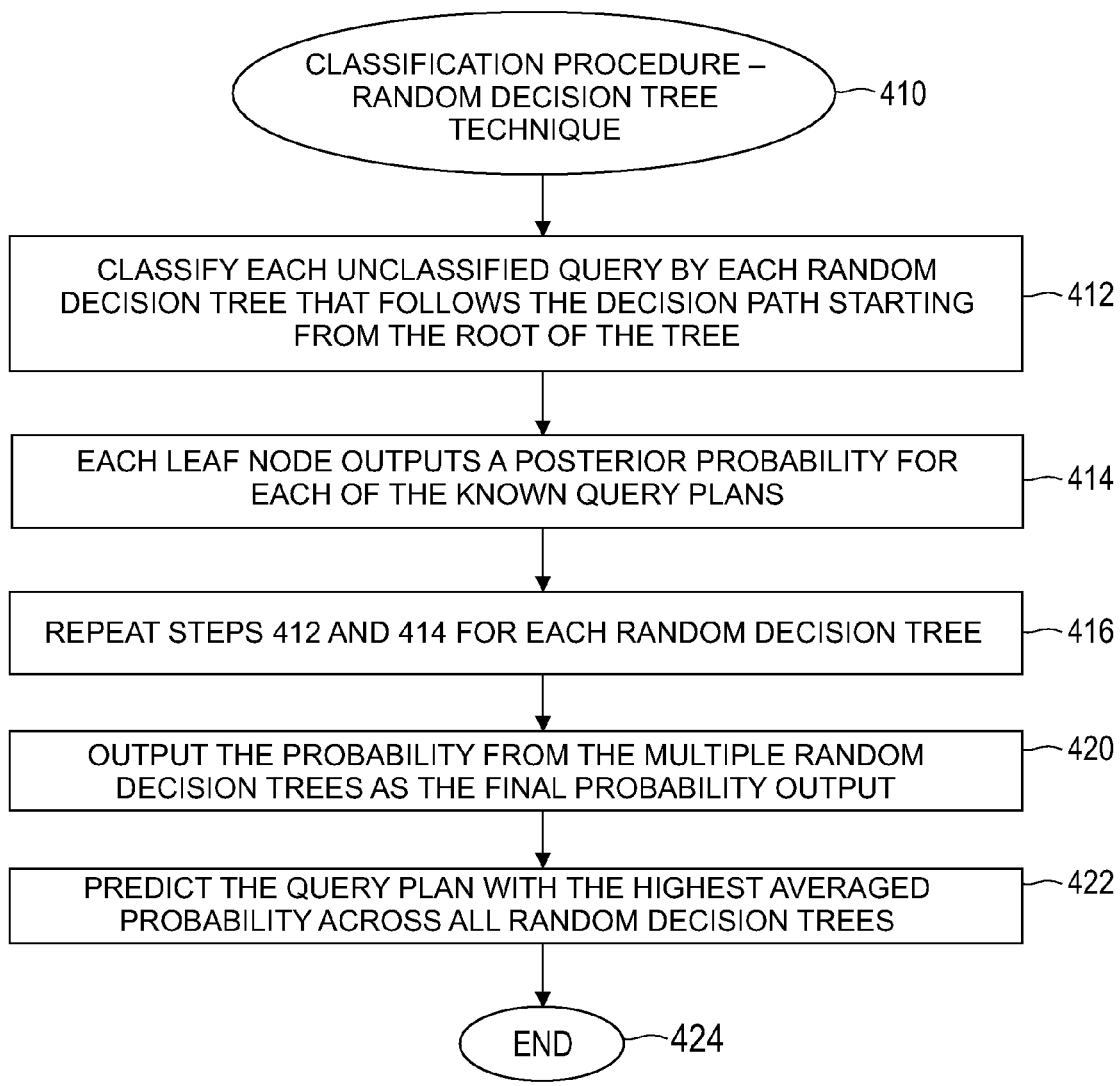
FIG. 4B is a flow chart of a classification procedure using a random decision tree technique in the process of FIG. 2, in accordance with embodiments of the present invention.

FIG. 4B is a flow chart of a classification procedure using a random decision tree technique in the process of FIG. 2, in accordance with embodiments of the present invention. The classification procedure using the RDT technique begins at step 410. In step 412, each unclassified query is classified by following a decision path in an RDT. Each decision path starts at the root of an RDT and ends at a leaf node. Upon reaching the leaf node in step 414, a posterior probability is computed and output for each of the known query execution plans. For example, if a leaf node contains three training examples, where two of the examples belong to query execution plan 1 and one of the examples belongs to query execution plan 2, then the probability for an unclassified query to be of plan 1 is ⅔ and the probability for an unclassified query to be of plan 2 is ⅓. Steps 412 and 414 are repeated in step 416 for each RDT.

In step 420, each posterior probability from the multiple RDTs is output and the outputted posterior probabilities are averaged across the multiple RDTs for each query execution plan. In step 422, a loss function is used to choose an optimal average posterior probability and the query execution plan associated therewith is selected as the prediction of the output of the query optimizer of database system 102 (see FIG. 1). In one embodiment using a 0-1 loss, the query plan learner automatically determines the query execution plan having the highest average posterior probability as the prediction of the output of the query optimizer. The classification procedure of FIG. 4B ends at step 424.

4.2.3 Adapting to New Query Plans Using RDTs

Figure 4C:
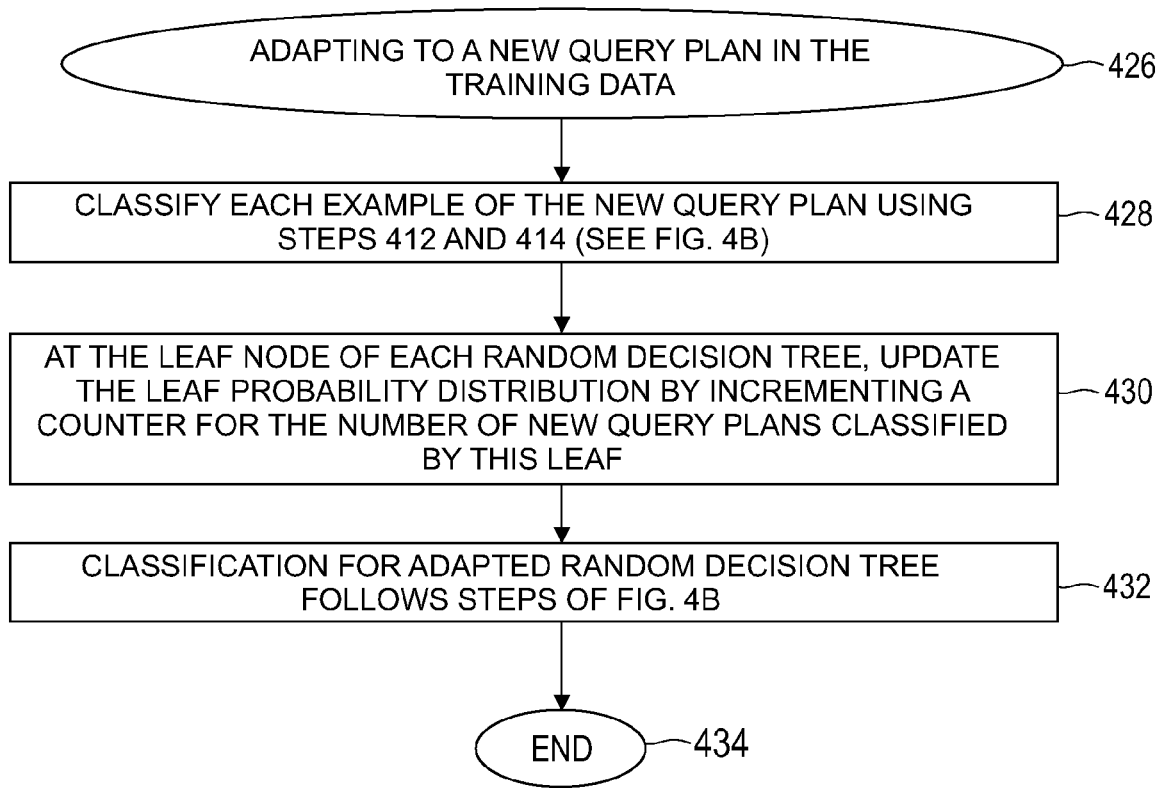
FIG. 4C is a flow chart of a process of adapting to a new query plan in the training data in the process of FIG. 4B, in accordance with embodiments of the present invention.

FIG. 4C is a flow chart of a process of adapting to a new query execution plan in the training data in the process of FIG. 4B, in accordance with embodiments of the present invention. The adapting process of FIG. 4C starts at step 426. In step 428, each training example of the new query execution plan is classified using steps 412 and 414 of FIG. 4B. At the leaf node of each RDT in step 430, the leaf probability distribution is updated by incrementing a counter for the number of new query execution plans classified by the leaf node. In step 432, the classification for the RDTs adapted via steps 428 and 430 follows the process of FIG. 4B. The process of FIG. 4C ends at step 434.

4.3 Implementation of AdaBoost

In one embodiment, an ECOC length between 2*c and 3*c is used, where c is the number of classes.

Choosing the weak learner appropriate for the domain was the main challenge of the AdaBoost implementation. The choice of a weak learner was guided by the observation that the selectivity of a single parameter can be used to discriminate between an optimal and a sub-optimal plan for a query in a particular selectivity region.

Figures 5, 6:
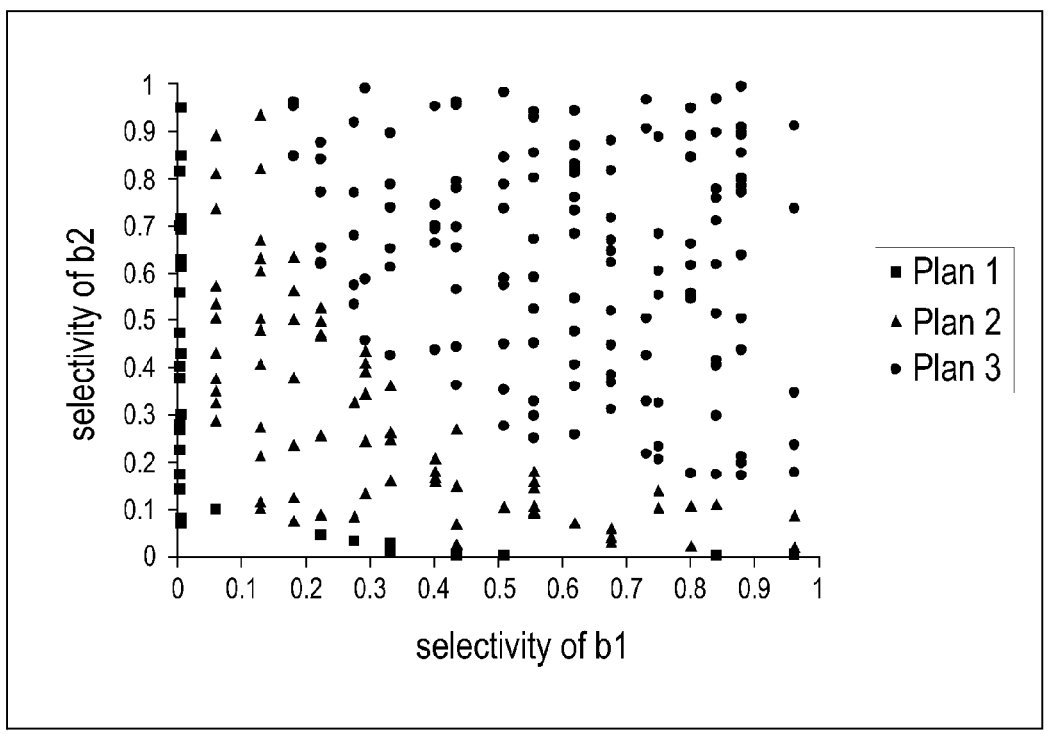
FIG. 5 is an example of a query template used in an implementation of a boosting technique in the process of FIG. 2, in accordance with embodiments of the present invention.
FIG. 6 depicts an optimal plan space generated by a database optimizer for the query of FIG. 5, in accordance with embodiments of the present invention.

Consider a query 500 in FIG. 5 based on the TPC-W benchmark. TPC-W is a web commerce benchmark created by the Transaction Processing Performance Council of San Francisco, Calif., which is designed to measure the performance of systems supporting users browsing and processing orders on a business web site. The plan space for the query in FIG. 5 according to the DB2 Universal Database version 8.2 optimizer is represented as graph 600 in FIG. 6. In this example, the optimizer chooses the optimal plan based on the product of the selectivities of the two parameters. Plan 1 in FIG. 6 executes a nested loops join with the relation Item as the outer, and is chosen by the optimizer when the product of selectivities of b1 and b2 is very low. This happens when one or both of the selectivities are close to 0, and their product does not exceed 0.01. Plan 2 in FIG. 6 performs a hash join with Author as the build input. Plan 2 is chosen for intermediate values of the two selectivities, with their product between 0.01 and 0.13. Plan 3 in FIG. 6 utilizes a hash join between the two relations with Item as the build input. Plan 3 is optimal when both selectivities are higher than 0.2 and their product is above 0.13.

For queries with d parameters, the optimizer chooses a query execution plan based on individual selectivities and/or on products of any subset of the d selectivities. Products of selectivities naturally correspond to estimates of the relative size of intermediate or final results during plan execution. Explicit enumeration of all possible products (i.e., of all possible subsets of parameters) is exponential. The weak learners in the AdaBoost implementation are designed to avoid the exponential explosion and to consider the selectivity of one parameter at a time. For Plan 1 in FIG. 6, it is observed that the product of the selectivities is low if either one of the selectivities is less than 0.004, in which case the selectivity of the other parameter is immaterial, or if both selectivity(b1)[0, 0.06] and selectivity(b2)F[0,0.05].

The design of the weak learners in the AdaBoost implementation is based on the above simple observation. Each weak learner is a discrete (i.e., bucketized) vector of weighted probabilities. The probabilities represent the likelihood that a particular plan is chosen by the optimizer when the selectivity falls within each bucket. The weights are adjusted over time by the AdaBoost meta-learner. A weak learner of this kind is defined for each parameter, and for each plan. Such weak learners are unary—they always claim that the point is a member of the class. The weak learners encode the strength of the claim in their confidence measure, which is proportional to the appropriate element of the weighted probability vector. The probability distribution is calculated using the conditional probability presented below:

$$Prob(\text{plan} \mid sel) = \frac{Prob(sel \wedge \text{plan})}{Prob(sel)} \quad (1)$$

Figure 7:
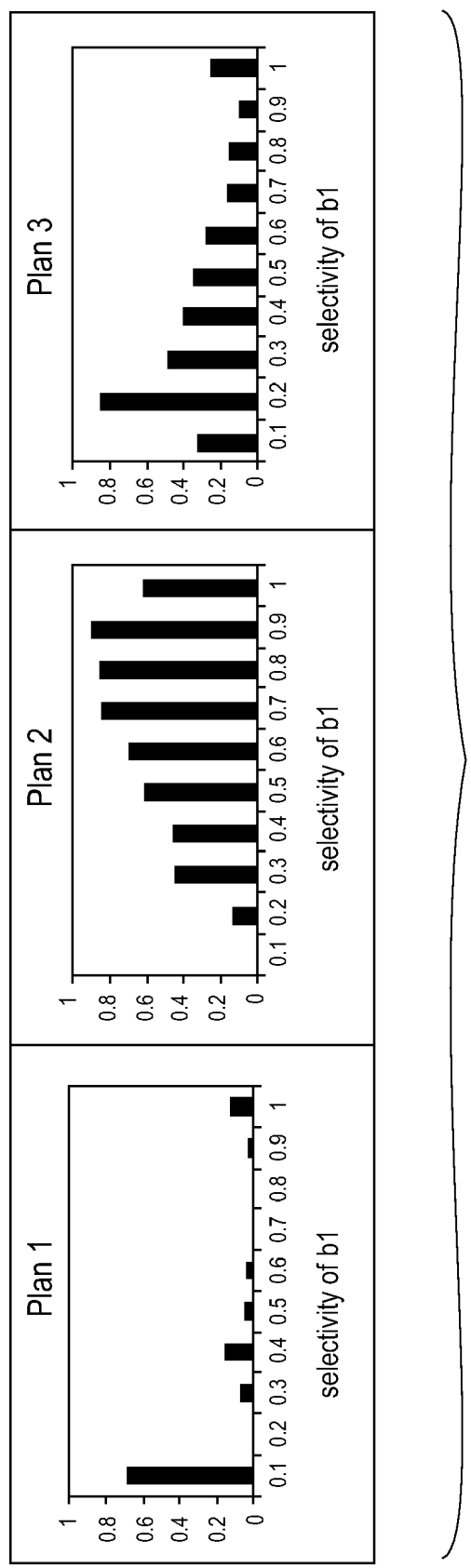
FIG. 7 depicts initial distributions for three plans given selectivities in the plan space of FIG. 6, in accordance with embodiments of the present invention.

As is apparent from formula (1), the AdaBoost implementation needs to consider only how many points that fall within the selectivity range of interest also map to the particular plan label. The initial distributions for Plans 1, 2 and 3 given selectivities of b1 are listed in graphs 700 in FIG. 7 for the data in FIG. 6.

The algorithm used in the implementation of AdaBoost has two parameters that influence prediction accuracy: the number of training rounds T for each binary classifier and the number of buckets in the probability distributions B. Each of these parameters is discussed below.

AdaBoost adjusts the weights of correctly and incorrectly classified points exponentially, and provides for exponential convergence. Each binary classifier is trained in increments of T rounds, and prediction accuracy is measured with respect to the training set after each T rounds. In one embodiment, the predefined increment of T rounds is 20 rounds. Training continues until one of the following conditions is met: (a) the total number of rounds is equal to a predefined round limit (e.g., 100 rounds), (b) accuracy on the training set reaches a predefined accuracy threshold (e.g., 95%) or (c) accuracy on the training set does not improve compared to T rounds ago.

The AdaBoost implementation uses equi-width histograms with B equal to a predefined number of buckets (e.g., B=20 buckets), each encompassing a predefined percentage (e.g., 5%) of the selectivity range. The setting of B=20 buckets, each encompassing 5% of the selectivity range works well for all query templates in the experiments described below in Section 5.

4.4 Implementation of Random Decision Trees

To adapt RDT for query plan prediction, one important improvement is made based on knowledge about the behavior of the optimizer. While predicates are still chosen at random, the decision threshold is no longer chosen at random. Instead, for a randomly chosen predicate, a threshold with the highest information gain is computed. In this way, it is more likely to generate pure nodes, which leads to smaller trees. The adaptation of RDT in the present invention is more efficient than Breiman's Random Forest (RF) [4]. The RF algorithm uses computationally intensive bootstrap sampling (i.e., random sampling with replacement) from the training set, while RDT uses the original training set. Additionally, RF evaluates information gain for a set of features, while RDT considers a single feature at a time. Finally, RF uses voting to classify a point, and RDT uses averaged probabilities, which may benefit prediction accuracy, particularly for multi-class problems [6].

In the RDT implementation of the present invention, the minimum number of training examples per leaf node is chosen to be 2, which is the default in traditional decision tree methods and a predefined number of trees are constructed. In one embodiment, 10 trees are constructed due to a reported result that there is no significant improvement in accuracy when more than 10 trees are constructed [6]. The depth of each tree is limited according to predefined criteria. In one embodiment, the tree depth is limited to 5 times the number of features, which allows a partitioning of the range of selectivity measures into up to 6 ranges. Since the number of training examples is at most a few hundred, and no empty nodes are generated, each tree is expected to be reasonable in size.

4.5 Improving Classification by not Making a Prediction

The accuracy of a classifier depends largely on the availability of sufficient training data. In many domains the number of training examples per class is highly non-uniform: some classes are represented by many more examples than others. During the experimental evaluation of AdaBoost it was noted that even on large training sets, the algorithm achieved higher prediction accuracy for the more common classes than for the less common. Not only were the points from the less common classes classified incorrectly, but a disproportionately large number of points were erroneously attributed to the less common classes.

It is often better to make no prediction for a test point than to classify that point incorrectly. For PQO, a misclassified point may incur a misprediction penalty that by far exceeds the optimization overhead. The algorithm of the present invention requires a reliable measure of prediction confidence that directs the algorithm to give up on a point and generate an uncertain classification (i.e., a classification of "no plan").

The Hamming distance as a measure of prediction confidence was attempted to be used. The algorithm was trained as before, but test points that fell outside the Hamming distance threshold of the closest class were classified as uncertain. It was observed that previously correctly-classified points were now being classified as uncertain at approximately the same rate as the misclassified points, irrespective of the Hamming distance threshold. As a result, the overall prediction accuracy did not increase. It was concluded that the mechanism for deciding the confidence of a prediction needed to be incorporated during the training phase to ensure the proper generation of training classes.

During the training phase, all points that represent uncommon classes (i.e., classes of size smaller than a predefined threshold S) are placed into a single unreliable class. Hereinafter, S is also referred to as the class size threshold. The classifier is then trained as before, except that there are now fewer training classes, with all uncommon plans now mapped to a single class. During the test phase, all points that are classified as belonging to the unreliable class are now given an uncertain classification. In one embodiment, to determine a class size threshold, cross-validation is used on several datasets with a training set of size 500. The term cross-validation is used to describe the choice of some aspect of the machine learning model empirically, using available training data. By gradually increasing the threshold, it was found that plans represented by fewer than 20 query instances were too small to classify reliably. For a training set of size 500, this corresponds to not making a prediction for plans that take up less than 4% of the plan space. It was found that the class size threshold of 20 points worked well for all query templates and training set sizes, and it is concluded that this parameter does not need to be learned with each new query template.

The training time of the algorithm is linear in the number of classes, and is reduced by grouping all uncommon plans together, as there are now fewer binary classifiers to train.

This technique reduces the misprediction rate by 5-10% for most queries, at the cost of some "no prediction" outcomes. For a mispredicted plan, the penalty depends on how suboptimal the chosen plan is. For a "no prediction" outcome, the optimizer is called and then an optimal plan is used. The penalty for the "no prediction" outcome is therefore the cost of running the optimizer. The only way to compare a two-outcome classifier with a three-outcome classifier is to compute the total expected time with appropriate empirical measurements of the appropriate penalties. When this comparison was done for AdaBoost, it was found that the three-outcome classifier performed as well or better than the two-outcome classifier for almost all queries. Therefore, only experimental results for the three-outcome version of AdaBoost are reported in Section 5.

A three-outcome version of RDTs was not implemented primarily because the two-outcome version performed very well, as is shown in Section 5.

4.6 The Off-Line and On-Line Phases

Given a query template, and domains and distribution (e.g., uniform, Gaussian, or Zipf) of the query parameters, a training set of the appropriate size is automatically generated for the query. For each point in the parameter space, the regular query optimizer is called and returns the query execution plan. The query is not executed. Alternatively, the real-time query workload is recorded, along with the optimizer's predictions. This dataset is then used to train the classification algorithm. Training is computationally expensive and happens off-line. This is in line with how most query optimizers collect statistics.

For AdaBoost, during this phase each binary classifier builds the model of the training dataset. A binary classifier executes between 20 and 100 training rounds T, and considers each available weak learner on every round. The number of binary classifiers is linear in the number of classes c, and the number of weak learners is exactly the number of query parameters d. Each weak learner computes probability distributions over the dataset, and is linear in the size of the dataset n. The time complexity of the training phase is therefore $O(T*d*c*n)$. The output of training is the set of T discrete probability distributions (each containing B=20 entries) and T weights for each class, along with the optimal execution plan for that class. The space complexity of the model is $O(T*B*c)$.

For Random Decision Trees, k random trees are independently constructed during the training phase. It has been reported in [6] that k=10 returns satisfactory accuracy. The time complexity of training is $O(k*d*\log d*n*\log n)$. The output of the training phase has space complexity of $O(d*\log n)$.

When a new query matches an already-seen template for which the classifier has been trained, the instance will be classified on-line by the algorithm. If the classification outcome points to one of the learned classes, the plan for that class will be returned to the query execution module, and the query optimizer will not be invoked. If, however, an uncertain outcome is generated, the optimizer will be called upon to generate an execution plan. Optionally, query parameters and plan information can be stored for future re-training.

5 Experimental Evaluation

5.1 Experimental Setup

The performance of the classifiers of the present invention was evaluated on the DB2 Universal Database version 8.2, a commercial RDBMS with a cost-based optimizer. All experiments were executed on a Pentium 4 3.0 GHz CPU, with 512 MB of RAM, running the Linux operating system. The optimizer was executing at the highest optimization level (i.e., level 9). The performance of AdaBoost and RDT were evaluated with respect to two database schemas. The first schema conforms to the TPC-W benchmark [3], with uniformly distributed data. Two database sizes were used for the TPC-W experiments: 20 MB and 100 MB. Varying the size of the database resulted in a different number and types of optimal plans, and the shape of the plan space varied significantly. The second schema is the DMV database [15]: a synthetic database with skewed data distributions and correlations. A 60 MB database was used for the second schema. In the results discussed below, the scale of an experiment refers to the database size in megabytes.

The choice of relatively small databases is consistent with the target applications that demand very fast query response. When query execution time is small, optimization time becomes a significant component of the overall time. The space overhead of the algorithms of the present invention was no more than 30 KB for all experiments.

5.2 Query Templates

In this section, the performance of the present invention's algorithms is evaluated with respect to 6 query templates. The templates are chosen so that optimization time constitutes a significant portion of the overall time. These are the queries that can potentially benefit from Parametric Query Optimization. Although many more templates were considered, the ones chosen to be highlighted herein are the cases where the algorithms of the present invention make the most difference. For many other queries, such as queries that are trivial to optimize or take a long time to execute, the opportunities for improvement were small. To show the applicability of the algorithms of the present invention to a variety of query templates, templates are chosen with a varying number and types of parameters, and with a varying number of joins.

The template TPCW-1 is template 500 in FIG. 5, the template TPCW-2 is template 800 in FIG. 8, and TPCW-3 is template 900 in FIG. 9. The template DMV-1 is template 1000 shown in FIG. 10. DMV-2 is a template 1100 shown in FIG. 11 and contains an equality predicate on a categorical attribute country. Unlike numeric attributes, it is not expected that nearby values of categorical attributes have correlated behavior. Finally, DMV-3 is a template 1200 shown in FIG. 12.

For each of the above templates in FIGS. 5 and 8-12, up to 1000 random parameter combinations are generated. The distribution of each parameter matches the distribution of the column to which the parameter is compared. In some cases it is impossible to generate 1000 distinct parameter combinations because of the limited number of distinct values in the database. In such cases the largest possible dataset is generated. The training set of size 200 is chosen uniformly at random from the dataset; the remainder of the dataset is used for testing. The measurements used in this section represent averages over 5 random splits of the dataset into training and testing sets.

A successful machine learning technique achieves high prediction accuracy with a limited number of training examples. The effects of training set size on accuracy were studied and it was observed that the classification accuracy for RDTs improves only 0-3% when the size of the training set is increased beyond 200 points. For RDTs, all plans were considered during training and testing. In one embodiment, the implementation of AdaBoost never chooses a plan if that plan is represented by fewer than 20 points in the training set. Increasing the size of the training set reduces the proportion of unclassified points, but does not significantly change the ratio of correct to incorrect classifications among the points for which classification was attempted. Increasing the size of the training set would enhance the performance of AdaBoost. However, the results presented herein are based on this limited training set because (a) it is less time-consuming to train on a small training set, and (b) for larger training sets, only a marginal improvement in classification accuracy for RDTs was observed. For a fair comparison, the training set size is kept constant, and 200 training points are used for all experiments in this section.

The accuracy and overall performance improvement achieved by the algorithms of the present invention for the first 4 query templates (i.e., the templates in FIGS. 5 and 8-10) is presented in Sections 5.3 and 5.4. The final two templates, DMV-2 and DMV-3 (i.e., the templates in FIGS. 11-12), are discussed in Section 5.5.

5.3 Learning from Optimizer Predictions

In the first part of the experiments, classifiers were trained on the plan space induced by the query optimizer, assuming that the query execution plan chosen by the optimizer is in fact the optimal plan for any given query instance. Table 1300 in FIG. 13 summarizes some of the characteristics of the plan space for the query templates in FIGS. 5 and 8-10. The column labeled Scale in FIGS. 13-18 indicates the scale of the associated experiment (i.e., the database size in megabytes).

The third column (i.e., the column labeled Plans) of table 1300 shows the number of distinct query plans that were generated using 200 training queries. The fourth column (i.e., the column labeled Common Plans) of table 1300 shows how many of those distinct query plans met the AdaBoost threshold that requires a plan to be chosen at least 20 times out of 200. The last column (i.e., the column labeled Coverage) of table 1300 shows the fraction of the training points that employ plans that are above threshold. Table 1300 shows, for example, that for query DMV-1, 87% of the 200 training points optimized to one of the 3 plans that are above threshold.

Accuracy results are summarized in table 1400 in FIG. 14. Table 1400 indicates how often each of the classifiers was correct and incorrect. For AdaBoost in table 1400, the frequency at which the algorithm made no prediction is also included (i.e., in the column labeled No Plan). Note that the "No Plan" (i.e., no prediction) column values are close to the proportion of queries not covered by plans that are above threshold. The results indicate that Random Decision Trees achieve higher prediction accuracy on this domain compared to the present invention's implementation of AdaBoost. Both algorithms misclassify roughly the same portion of the dataset, but AdaBoost often makes no prediction, while RDT attempts to classify every point, so more points are classified correctly by RDT overall.

The classifiers choose a suboptimal plan some of the time. Nevertheless, it is possible that this suboptimal plan has a performance comparable to the optimal plan. The remainder of this section investigates how much worse a suboptimal plan can be, and to what extent the misprediction penalty can be offset by the reduction in optimization overhead. The performance of the classifiers are compared with two alternatives: (a) the cost of the plan generated by the optimizer plus the optimization overhead for every query (OPT) and (b) total execution time of every query according to every plan in the optimal plan space, weighted by the frequency of each plan, plus the cost of a single query optimization (AVG). The second alternative represents the situation where a single plan is chosen for all instances of a query template. Typically, the first plan that is encountered by the system is chosen, and the probability of any particular plan to be encountered first is approximately proportional to the frequency of that plan in the dataset.

It would be difficult to ask the commercial system being used to estimate the cost of an arbitrary plan on different parameters. Thus, the actual execution time of each query is measured. It was also discovered that, given a single query template, optimization time may vary depending on the plan that is ultimately chosen by the optimizer. This is because the choice of a plan affects how many plans are pruned at intermediate stages of plan generation. Therefore, it is not assumed that optimization time is constant for a given query template, and the optimization time is measured per plan.

Table 1500 in FIG. 15 shows the improvement achieved by the machine learning methods of the present invention compared to OPT and AVG. The improvement is calculated as $100\%*(T_c-T_m)/T_c$, where $T_c$ is the time taken by one of the currently available methods (i.e., OPT and AVG), and $T_m$ is the time taken by one of the machine learning methods of the present invention. Positive values in the Improvement columns of table 1500 correspond to cases where the machine learning methods outperform the currently available methods. All values in table 1500 are cumulative and represent totals over the entire test set.

In table 1500, total times for both RDT and AdaBoost include the execution times of all points in the test set according to the chosen plan plus the overhead of the classification algorithms, which is on the order of 10 microseconds per point for both algorithms. AdaBoost also includes the optimization time for the points for which an uncertain prediction was generated, and the cost of the optimal plan is used in this case.

As is apparent from FIG. 15, AdaBoost achieves an improvement over OPT in most cases, while RDT achieves an improvement over OPT in all cases. Furthermore, the improvement achieved by RDT is always at least as high as that of AdaBoost for the following two reasons. First, RDT has a lower rate of mispredictions for most templates, and therefore suffers less of a misprediction penalty from choosing a sub-optimal plan. Second, RDT never returns an uncertain prediction and suffers no optimization overhead. AdaBoost did not outperform the OPT method for TPCW-2 on the 100 MB database because it did not attempt to classify enough of the space to offset the misprediction penalty by the reduction in optimization overhead.

It appears more difficult to outperform AVG for some queries. Despite high prediction accuracy on TPCW-3, even RDT performs 8% worse than AVG. This query has the highest optimization overhead: optimization takes a total of 29.5 sec, and execution—a total of 0.3 sec for 800 queries in the test set. Furthermore, there is no significant difference between the plans—executing all queries according to any single plan differs only marginally from optimal execution.

There is another important reason that limits the performance improvements realized by the algorithms of the present invention. When training on the plan space induced by the optimizer, it is expected that the plans chosen by the optimizer are indeed optimal. This characterization of the plans chosen by the optimizer, however, is not always the case. Section 5.4 explores a method for correcting the optimizer.

5.4 Learning from Observation

The task of a relational optimizer is to choose a reasonably good plan among an exponential number of query execution plans. The optimizer does not explore the entire plan space, and brings no guarantee of global plan optimality. Additionally, the optimizer is guided by statistics that, even if accurate, represent only a summary of the data distributions and selectivities. For frequently executed short-running queries, it may be possible to build in "corrections" to the optimizer based on past execution time data. This is the Extended Parametric Query Optimization (EPQO) version of the problem as described above in Definition 3.

In the remainder of this section, the query execution plans returned by the optimizer are referred to as optimal plans, and plans that were observed to perform best are referred to as best plans.

To check the performance of the optimizer, actual query execution times are reviewed for every query according to every plan that was optimal in some region of the selectivity space. It is observed that this method introduces some noise—executing a particular query according to the same plan several times may yield slightly different execution times, especially if queries are fast-running. Additionally, for a particular query the best plan may perform only marginally better than the optimal plan. If all points are re-labeled with best labels, the resulting plan space is highly irregular and very difficult to learn. A simple method is used for reducing the noise. A point is re-labeled with its best label only if the best plan outperforms the optimal plan by more than 30%. The new labeling is referred to as HYBRID.

Having re-labeled the space, the total execution times of all queries in the training set according to the optimal labeling are compared with the execution times according to the hybrid labeling. These results are summarized in table 1600 in FIG. 16. For TPCW-1 and for TPCW-2 on the 20 MB database, the optimizer is making accurate predictions. However, the rest of the templates have some potential for improvement, the remainder of this section focuses on these templates.

Prediction accuracy of AdaBoost and RDT on the test sets is summarized in table 1700 in FIG. 17. Prediction accuracy on the observed labels (HYBRID) is lower than the accuracy on the labels generated by the optimizer (OPT). The reason for this lower prediction accuracy is still the presence of noise, which makes the shape of the plan space more difficult to learn. In this noisy space, not making a prediction is starting to benefit AdaBoost.

Table 1800 in FIG. 18 summarizes the overall performance improvement of AdaBoost and RDT over OPT and AVG. It is observed that re-labeling according to the observed optimal plan benefits all query templates. RDT now performs the same as AVG on TPCW-3 at scale 20, but outperforms both OPT and AVG in all other cases. AdaBoost still does significantly worse than AVG for TPCW-3 on the 20 MB database, but outperforms OPT and AVG in all other cases. The performance improvement of both algorithms of the present invention is more significant than when the classifiers were trained on the OPT space.

Based on these results, machine learning techniques can benefit from learning on the HYBRID space. Generating HYBRID involves optimizing and executing each query in the training set according to every plan that is optimal in some region of the plan space. This is much more expensive than generating OPT, which does not involve any query executions, but is not prohibitively expensive for the target workloads of fast-running queries.

The HYBRID space can be used to improve the performance of the algorithms of the present invention. It can also be used to determine whether to use one of the algorithms of the present invention, or to simply optimize once and execute all queries according to a single plan, and perhaps suggest a good candidate plan. This approach works best for queries for which there is no significant difference between individual plans, such as TPCW-3 on the 20 MB database.

5.5 Queries with a Sparse Plan Space

This section focuses on query templates DMV-2 and DMV-3. For queries that utilize only, or mostly, equality predicates, many different parameter values will map to the same set of selectivities. In the extreme case, for a query that contains only equality predicates on uniformly distributed attributes, all points will map to a single set of selectivity measures, which in turn maps to a single optimal plan. It was observed that 165 unique points were present in the selectivity space of DMV-2, mapping to 9 plans. For DMV-3, 24 unique points represented 6 distinct plans.

For such queries, a much simpler method to construct a query plan cache can be used. With a sufficiently large training set, not only all classes, but also all points, will be represented in the training set. A hash table that stores the mapping between the selectivities and the optimal plans will suffice; no learning is required, since the algorithm will never have to deal with any previously unseen selectivities.

However, it is difficult to tell if the training set is exhaustive by looking at that set alone. This final set of experiments demonstrates that the algorithms of the present invention can be used for queries such as DMV-2 and DMV-3. In both cases, RDT and AdaBoost are trained on all available points, and return the prediction accuracy on the training sets.

RDT achieves very high prediction accuracy on both sets: 163 out of 165 points are classified correctly for DMV-2, and 22 out of 24 points are correct for DMV-3. AdaBoost does well on DMV-3, with only 1 misprediction out of 24, but fails to learn the space for DMV-2—the algorithm only attempts to make a prediction 7% of the time, and is 75% accurate when it does predict. However, this failure to learn is apparent at the end of the training phase. The accuracy on the training set indicates that the classifier did not learn the space sufficiently well and therefore should not be used.

6 Discussion

As has been demonstrated thus far, machine learning techniques can be used to achieve an overall performance improvement for some queries. However, these techniques are only practical if it is also possible to automatically identify cases where using the algorithms of the present invention is not beneficial, and even impairs performance.

For AdaBoost, the accuracy on the training set is a good indication of accuracy on unseen data, provided that it comes from the same distribution as the training set. If the classifier fails to achieve the desired accuracy on the training set, or returns the "no plan" prediction too often (as for DMV-2), the system declares that the classifier cannot be used, and possibly collects more training data.

Random Decision Trees always achieve very high accuracy on the training dataset. However, this accuracy carries no guarantee that the algorithm will perform well on unseen data. A simple validation technique can be adapted to verify whether an RDT classifier is ready to be used for a particular query template. Similar to the experiments disclosed herein, the training dataset can be split into two subsets. RDT can be trained on the first subset, and validated against the second.

As an additional safety measure that ensures that the classifiers are up-to-date and accurate, the optimizer is invoked when the system is idle to validate a number of recent predictions made by the algorithms of the present invention. If it is determined that the classifier no longer achieves the desired accuracy, it can be re-trained on this more recent data set.

The algorithms of the present invention targets workloads of a large number of fast-executing parametric queries, with the objective of optimizing the aggregate behavior of the system. Thus, the implementation described herein targets average-case performance. An alternative, and possibly conflicting, objective may be to target worst-case performance. Please see [15] for a discussion of risk vs. opportunity considerations. The machine learning methods disclosed herein can be configured to optimize for different objectives in a simple yet principled way: by adjusting the loss function used during training. To optimize for the average case, the present invention penalizes all mis-predictions during the training phase equally. If the objective of the present invention was to bound worst-case performance, the loss function would incorporate the actual mis-prediction penalty, possibly in an exponential way.

The experimental evaluation herein reports average-case results. However, worst-case results were also measured. The worst-case behavior is strictly better than OPT for most queries. For some worst-case queries, the cost of the algorithms of the present invention is a significant multiple of the cost of OPT. These results, however, cannot be compared directly to the maximum degradation results reported in AniPQO [11]. The measurements for the present invention are based on actual execution time, while AniPQO is based on optimizer estimates that are more likely to be stable at plan boundaries, where most mis-predictions take place. A full comparison of the present invention to AniPQO is included in the Section 7. Additionally, the worst-case performance for the present invention may be biased by the fact that all queries used herein have very short execution times.

7 Comparison to Other Work

Ioannidis and Kang [14] describe the applicability of several randomized algorithms to Parametric Query Optimization, applied to run-time parameters that take on discrete values, such as the number of buffer pages allocated to a query and types of available indexes. The algorithms of the present invention work for both discrete and continuous parameters.

Reddy and Haritsa [19] study properties of plan spaces on a suite of commercial query optimizers. Reddy and Haritsa challenge the foundations underlying traditional geometric PQO approaches by observing that plan optimality regions may not be convex and may not be limited to a single contiguous region. These characteristics of plan optimality regions were observed for some of the query templates described herein (e.g., DMV-1), and the algorithms of the present invention were able to learn such plan spaces successfully.

Hulgeri and Sudarshan [12] propose AniPQO: a geometric solution to PQO that samples the parameter space and attempts to approximate boundaries between regions of plan optimality by constructing an explicit decomposition of the space. AniPQO extends the optimizer to enable plan-cost evaluation probes that return the estimated cost of a given plan at a given point in the parameter space. Commercial optimizers do not readily provide such functionality. Hulgeri and Sudarshan argue that such probes are cheaper than regular optimizer and extend a Volcano-based optimizer with which they are working to provide for such probes. In working with a commercial optimizer, it was found that plan-cost evaluation probes would be nearly as expensive as regular optimizer calls. Considering that the probes also produce cost estimates, and not actual costs, it was decided that this type of evaluation would not be used and instead the algorithms of the present invention were evaluated with respect to actual execution time. For this reason, a direct side-by-side comparison between AniPQO and the algorithms of the present invention cannot be presented.

AniPQO theoretically works with any number of query parameters, discrete and continuous, but is impractical for more than 4 parameters because the size of the training set (i.e., the number of optimizer calls) grows exponentially with the number of parameters. Either of the algorithms of the present invention leverages machine learning techniques to successfully learn the plan space with far fewer training points, and hence scales beyond 4 parameters. In fact, each of the experiments described herein use no more than 200 training points, compared to over 1000 points for many queries in [12]. This advantage comes from variance-reducing techniques inherent to RDTs and AdaBoost.

While geometric in nature, RDTs and AdaBoost are both less sensitive to the shape of the plan space compared to explicit geometric techniques like AniPQO. AniPQO was demonstrated to work on a class of SPJ queries with a "smooth" plan space (i.e., optimality regions are convex and there are no discontinuities in the plan space). The algorithms of the present invention work for a larger class of queries: SPJ and aggregate, with continuous and discrete attributes, on uniform and skewed data sets.

Because the cost of testing is small, the algorithms of the present invention can be used to optimize correlated subqueries. Queries containing correlated subqueries often cannot be rewritten into a single query block. In such cases, commercial optimizers optimize the outer query and the inner subquery as separate query blocks. From the point of view of the inner subquery, the outer references are parameters. The inner query may also have bind variables of global scope. The inner subquery will be called multiple times with various values for the parameters. Known commercial systems currently optimize a query once. While some systems abandon a query execution and reoptimize when the current execution looks bad [15], no conventional system routinely reoptimizes a correlated subquery depending on the values of the outer reference.

8 Conclusions

Machine learning methods can be used to accurately model predictions of a relational query optimizer. Based on these models, one can derive plans much more cheaply than the optimizer can. Further, the plans generated this way perform better than using a single pre-optimized plan for a query template.

An RDT-based method outperformed a method based on AdaBoost, although AdaBoost still outperformed the optimizer for most examples. It is common in machine learning that different classes of problems have different "best" learning algorithms. This concept is referred to as inductive bias in the machine learning literature [16].

Previous PQO methods considered only optimizer cost estimates and reasoned about the misprediction penalty in terms of those estimates. In the techniques disclosed herein, query execution time is measured and the actual misprediction penalty is derived. The present invention is the first to demonstrate that a PQO approach can result in savings beyond query optimization time, and achieve a significant overall net win over the methods currently available in relational database systems.

Since the optimizer provides just a model of the execution cost, sometimes the actual best plan is not the one chosen by the optimizer. A technique described above shows how to "correct" the optimizer's plan selection within the machine learning model, using actual performance results for a query template. A performance improvement of more than an order of magnitude can be achieved for some queries.

9 Computing System

Figure 19:
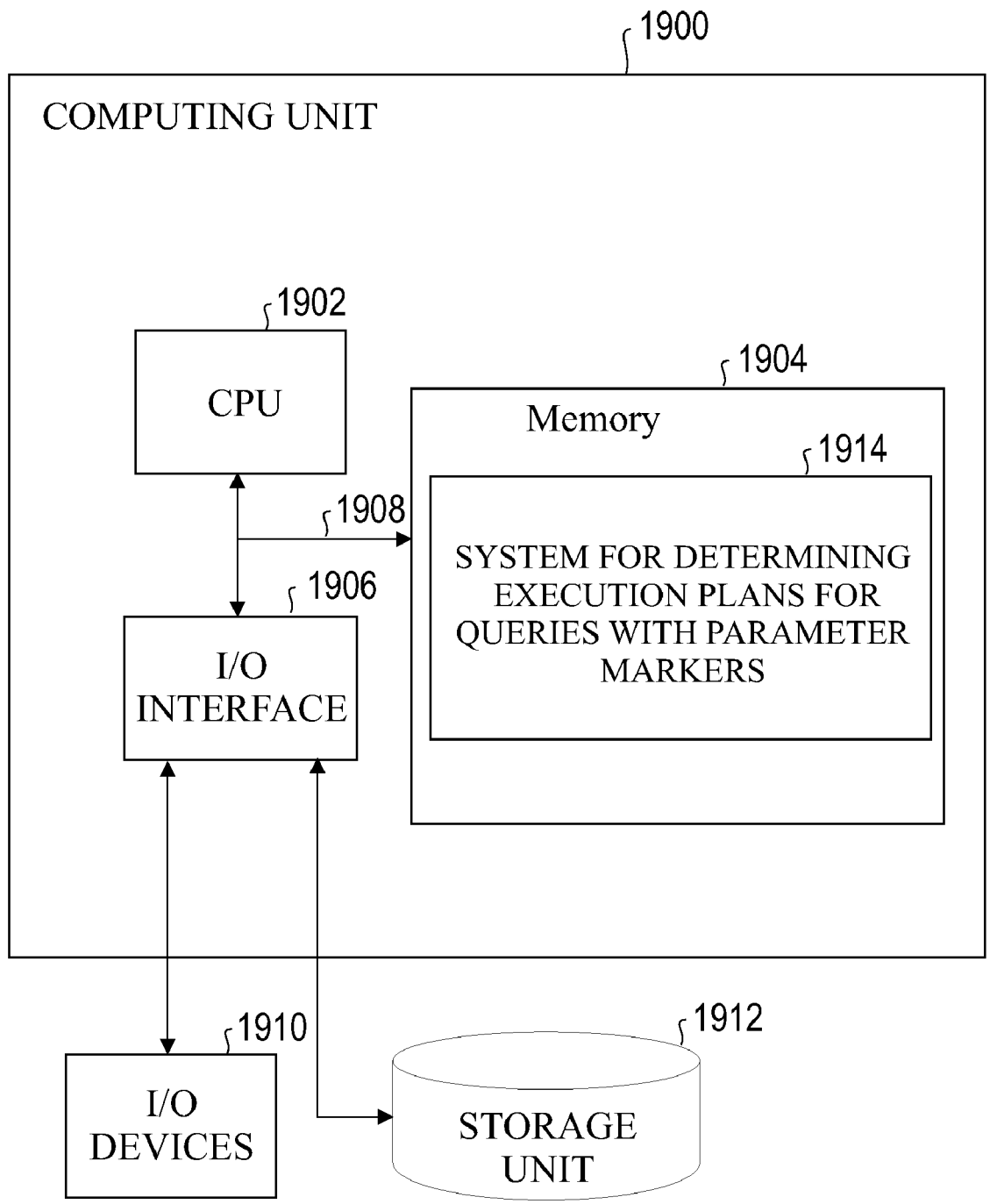
FIG. 19 is a computing system for implementing the process of FIG. 2, in accordance with embodiments of the present invention.

FIG. 19 is a computing system for implementing the process of FIG. 2, in accordance with embodiments of the present invention. Computing unit 1900 is suitable for storing and/or executing program code of a system for automatically and adaptively determining query execution plans for queries having parameter markers 1914, and generally comprises a central processing unit (CPU) 1902, a memory 1904, an input/output (I/O) interface 1906, a bus 1908, I/O devices 1910 and a storage unit 1912. CPU 1902 performs computation and control functions of computing unit 1900. CPU 1902 may comprise a single processing unit, or be distributed across one or more processing units in one or more locations (e.g., on a client and server).

Local memory elements of memory 1904 are employed during actual execution of the program code of query execution plan determination system 1914. Cache memory elements of memory 1904 provide temporary storage of at least some program code in order to reduce the number of times code must be retrieved from bulk storage during execution. Further, memory 1904 may include other systems not shown in FIG. 19, such as an operating system (e.g., Linux) that runs on CPU 1902 and provides control of various components within and/or connected to computing unit 1900.

Memory 1904 may comprise any known type of data storage and/or transmission media, including bulk storage, magnetic media, optical media, random access memory (RAM), read-only memory (ROM), a data cache, a data object, etc. Storage unit 1912 is, for example, a magnetic disk drive or an optical disk drive that stores data. Moreover, similar to CPU 1902, memory 1904 may reside at a single physical location, comprising one or more types of data storage, or be distributed across a plurality of physical systems in various forms. Further, memory 1904 can include data distributed across, for example, a LAN, WAN or storage area network (SAN) (not shown).

I/O interface 1906 comprises any system for exchanging information to or from an external source. I/O devices 1910 comprise any known type of external device, including a display monitor, keyboard, mouse, printer, speakers, handheld device, printer, facsimile, etc. Bus 1908 provides a communication link between each of the components in computing unit 1900, and may comprise any type of transmission link, including electrical, optical, wireless, etc.

I/O interface 1906 also allows computing unit 1900 to store and retrieve information (e.g., program instructions or data) from an auxiliary storage device (e.g., storage unit 1912). The auxiliary storage device may be a non-volatile storage device (e.g., a CD-ROM drive which receives a CD-ROM disk). Computing unit 1900 can store and retrieve information from other auxiliary storage devices (not shown), which can include a direct access storage device (DASD) (e.g., hard disk or floppy diskette), a magneto-optical disk drive, a tape drive, or a wireless communication device.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code of query execution plan determination system 1914 for use by or in connection with a computing unit 1900 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 1904, ROM, a rigid magnetic disk and an optical disk. Current examples of optical disks include compact disk-read-only memory (CD-ROM), compact disk-read/write (CD-R/W) and DVD.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

APPENDIX A

List of Cited References

[1] Oracle 9i database performance tuning guide and reference. download-west.oracle.com/docs/cd/B10501_01/server.920/a96533/toc.htm.
[2] Stanford Racing. www.stanfordracing.org.
[3] TPC: Transaction processing performance council. www.tpc.org.
[4] L. Breiman. Random forests. *Machine Learning,* 45(1): 5-32, 2001.
[5] T. G. Dietterich and G. Bakiri. Solving multiclass learning problems via error-correcting output codes. *Journal of Artificial Intelligence Research,* 2:263-286, 1995.
[6] W. Fan et al. Effective estimation of posterior probabilities: Explaining the accuracy of randomized decision tree approaches. In *IEEE ICDM,* 2005.
[7] Y. Freund and R. E. Schapire. A decision-theoretic generalization of on-line learning and an application to boosting. *Journal of Computer and System Sciences,* 55(1): 119-139, 1997.
[8] Y. Freund and R. E. Schapire. A short introduction to boosting. *Journal of Japanese Society for Artificial Intelligence,* 14(5):771-780, 1999.
[9] A. Ghosh et al. Plan selection based on query clustering. In *VLDB,* 2002.
[10] G. Graefe et al. MS SQL Server 7.0 query processor. www.microsoft.com/technet/prodtechnol/sql/70/maintain/sgl7qp.mspx.
[11] A. Hulgeri and S. Sudarshan. Parametric query optimization for linear and piecewise linear cost functions. In *VLDB,* 2002.
[12] A. Hulgeri and S. Sudarshan. AniPQO: Almost nonintrusive parametric query optimization for nonlinear cost functions. In *VLDB,* 2003.
[13] Y. Ioannidis et al. Parametric query optimization. The *VLDB Journal,* 6(2):132-151, 1997.
[14] Y. Ioannidis and Y. Kang. Randomized algorithms for optimizing large join queries. In *ACM SIGMOD,* 1990.
[15] V. Markl et al. Robust query processing through progressive optimization. In *ACM SIGMOD,* 2004.
[16] T. M. Mitchell. *Machine Learning.* McGraw Hill, 1997.
[17] C. S. Mullins. Coding DB2 SQL for performance: The basics. www-106.ibm.com/developerworks/db2/library/techarticle/0210 mullins/0210 mullins.html.
[18] J. R. Quinlan. C. 4.5: *Programs for Machine Learning.* Morgan Kaufmann, 1993.
[19] N. Reddy and J. R. Haritsa. Analyzing plan diagrams of database query optimizers. In *VLDB,* 2005.
[20] R. E. Schapire and Y. Singer. Improved boosting algorithms using confidence-rated predictions. *Machine Learning,* 37(3):297-336, 1999.
[21] K. Turner and J. Ghosh. Error correlation and error reduction in ensemble classifiers. *Connection Science,* 8(3-4):385-403, 1996.
[22] V. N. Vapnik. *The Nature of Statistical Learning Theory.* Springer, 1995.

What is claimed is:

1. A computer-based method of automatically and adaptively determining query execution plans for queries having parameter markers, said method comprising:
generating, by a computing system, a first classifier trained by an initial set of training points;
dynamically updating, by a computing system at a first runtime thereof, at least one of a workload of queries processed by a database of said computing system and database statistics collected by said database for computing a plurality of selectivities;
collecting, by a computing system in an off-line phase thereof, said off-line phase being subsequent to said first runtime, a new set of training points, said collecting responsive to a detection of said dynamically updating;
modifying, by said computing system in said off-line phase, said first classifier into a second classifier, said modifying including utilizing said new set of training points;
receiving, by said computing system at a second runtime thereof, said second runtime being subsequent to said off-line phase, a query for said database, said query including one or more predicates, each predicate including one or more parameter markers bound to one or more actual values, and said one or more predicates associated with one or more selectivities of said plurality of selectivities in a one-to-one correspondence; and
automatically determining a query execution plan by said computing system, said automatically determining including mapping, by said second classifier, said one or more selectivities into said query execution plan, wherein said query execution plan is included in an augmented set of training points, said augmented set including said initial set and said new set,
wherein said generating said first classifier comprises utilizing a machine learning technique, wherein said modifying said first classifier into said second classifier includes maintaining said first classifier incrementally, wherein said machine learning technique is a boosting technique, and wherein said method further comprises:
determining a subset of training points of said initial set of training points, said subset of training points belonging to a plurality of classes, each class having less than a predetermined threshold coverage of said initial set of training points;
assigning training points of said subset of training points to a single unclassified class;

setting a number of classes to k, wherein k is one plus a number of classes having greater than said predetermined threshold coverage;

generating an error-correcting output code (ECOC) table of length 2*k;

training a binary classifier as said first classifier, said training including utilizing AdaBoost with confidence-rated predictions for each column in said ECOC table, said training said binary classifier including:

initializing said augmented set of training points with equal weights; and performing a training procedure for T rounds, each round of said training procedure comprising:

training a plurality of weak learners on said augmented set of training points, choosing a weak learner of said plurality of weak learners, said weak learner having a lowest training error of a plurality of training errors associated with said plurality of weak learners in a one-to-one correspondence, assigning a weight to said weak learner, said weight being a function of said lowest training error, assigning exponentially higher weight to any misclassified training points of said augmented set of training points, and assigning exponentially lower weight to any correctly classified training points of said augmented set of training points; and said training said binary classifier further including:

outputting a model including T weak learners and T weights, said T weights associated with said T weak learners in a one-to-one correspondence, each weak learner of said T weak learners chosen by said choosing said weak learner in each round of said T rounds, and each weight of said T weights assigned by said assigning said weight in each round of said T rounds.

2. The method of claim 1, further comprising:

evaluating a weighted vote from said T weak learners of said model, said evaluating including providing an error-correcting output code;

comparing said error-correcting output code to each row of a plurality of rows of said ECOC table;

computing a plurality of Hamming distances based on said comparing; and predicting a class corresponding to a row of said plurality of rows of said ECOC table, said row having a lowest Hamming distance of said plurality of Hamming distances.

3. The method of claim 1, further comprising adapting to a change in said workload by modifying said first classifier to said second classifier, wherein no new query execution plans meet the predetermined threshold coverage, said adapting comprising:

introducing said new set of training points in batches at time t, said t being indicated by a range of integers, wherein a lowest integer of said range of integers indicates a most recent batch of said batches;

weighting each training point of said augmented set by an associated at value of $\alpha^t$ set of $\alpha^t$ values, wherein $\alpha$ is between 0 and 1, said weighting each training point resulting in a decrease of weights of older training points of said augmented set of training points;

retiring any training point of said augmented set in response to said associated at value differing from zero by less than a first predetermined amount;

training all binary classifiers for a predefined number of additional rounds;

weighting each vote of said T weak learners in said model by an associated $\beta^t$ value of a set of $\beta^t$ values, wherein $\beta$ is between 0 and 1, said weighting each vote resulting in an emphasis of one or more votes of a subset of most recently trained weak learners, said subset of most recently trained weak learners being a subset of said T weak learners; and retiring, from said model, any weak learner of said T weak learners in response to said associated $\beta^t$ value differing from zero by less than a second predetermined amount.

4. The method of claim 1, further comprising adapting to a change in said workload, wherein a new query execution plan meets the predetermined threshold coverage and a query execution plan cache for storing said new query execution plan is not at capacity, said adapting comprising:

increasing a size of said ECOC table to accommodate a new class, said increasing resulting in an increased ECOC table;

fully training additional binary classifiers for one or more new columns of said increased ECOC table, said one or more new columns not included in said ECOC table prior to said increasing; and retraining other binary classifiers for classes other than said new class, said retraining including training said other binary classifiers for a predetermined number of rounds to incorporate training data for said new class, said training for said predetermined number of rounds not including a full training of said other binary classifiers.

5. The method of claim 1, further comprising adapting to a change in said workload, wherein a new query execution plan meets the predetermined threshold coverage and a query execution plan cache cannot store said new query execution plan without retiring an existing query execution plan of a plurality of existing query execution plans stored in said query plan cache, said adapting comprising:

selecting said existing query execution plan from said plurality of existing query execution plans;

retiring one or more training points of said augmented training set, said one or more training points associated with a class of said existing query execution plan;

maintaining said ECOC table with no changes;

retraining one or more binary classifiers for a predefined number of rounds to incorporate said new set of training points, said retraining said one or more binary classifiers not including a full training of said one or more binary classifiers.

6. A computing system comprising:

a processor; and a computer-readable memory unit coupled to said processor, said memory unit comprising a software application and instructions that when executed by said processor implement a method of automatically and adaptively determining query execution plans for queries having parameter markers, said method comprising:

generating, by a computing system, a first classifier trained by an initial set of training points;

dynamically updating, by a computing system at a first runtime thereof, at least one of a workload of queries processed by a database of said computing system and database statistics collected by said database for computing a plurality of selectivities;

collecting, by a computing system in an off-line phase thereof, said off-line phase being subsequent to said first runtime, a new set of training points, said collecting responsive to a detection of said dynamically updating;

modifying, by said computing system in said off-line phase, said first classifier into a second classifier, said modifying including utilizing said new set of training points;

receiving, by said computing system at a second runtime thereof, said second runtime being subsequent to said off-line phase, a query for said database, said query including one or more predicates, each predicate including one or more parameter markers bound to one or more actual values, and said one or more predicates associated with one or more selectivities of said plurality of selectivities in a one-to-one correspondence; and automatically determining a query execution plan by said computing system, said automatically determining including mapping, by said second classifier, said one or more selectivities into said query execution plan, wherein said query execution plan is included in an augmented set of training points, said augmented set including said initial set and said new set, wherein said generating said first classifier comprises utilizing a machine learning technique, wherein said modifying said first classifier into said second classifier includes maintaining said first classifier incrementally, wherein said machine learning technique is a boosting technique, and wherein said method further comprises:

determining a subset of training points of said initial set of training points, said subset of training points belonging to a plurality of classes, each class having less than a predetermined threshold coverage of said initial set of training points;

assigning training points of said subset of training points to a single unclassified class;

setting a number of classes to k, wherein k is one plus a number of classes having greater than said predetermined threshold coverage;

generating an error-correcting output code (ECOC) table of length 2*k;

training a binary classifier as said first classifier, said training including utilizing AdaBoost with confidence-rated predictions for each column in said ECOC table, said training said binary classifier including:

initializing said augmented set of training points with equal weights; and performing a training procedure for T rounds, each round of said training procedure comprising:

training a plurality of weak learners on said augmented set of training points, choosing a weak learner of said plurality of weak learners, said weak learner having a lowest training error of a plurality of training errors associated with said plurality of weak learners in a one-to-one correspondence, assigning a weight to said weak learner, said weight being a function of said lowest training error, assigning exponentially higher weight to any misclassified training points of said augmented set of training points, and assigning exponentially lower weight to any correctly classified training points of said augmented set of training points; and said training said binary classifier further including:

outputting a model including T weak learners and T weights, said T weights associated with said T weak learners in a one-to-one correspondence, each weak learner of said T weak learners chosen by said choosing said each weak learner in each round of said T rounds, and each weight of said T weights assigned by said assigning said weight in each round of said T rounds.

7. The computing system of claim 6, wherein said method further comprises:

evaluating a weighted vote from said T weak learners of said model, said evaluating including providing an error-correcting output code;

comparing said error-correcting output code to each row of a plurality of rows of said ECOC table;

computing a plurality of Hamming distances based on said comparing; and predicting a class corresponding to a row of said plurality of rows of said ECOC table, said row having a lowest Hamming distance of said plurality of Hamming distances.

8. The computing system of claim 6, wherein said method further comprises adapting to a change in said workload by modifying said first classifier to said second classifier, wherein no new query execution plans meet the predetermined threshold coverage, said adapting comprising:

introducing said new set of training points in batches at time t, said t being indicated by a range of integers, wherein a lowest integer of said range of integers indicates a most recent batch of said batches;

weighting each training point of said augmented set by an associated $\alpha^t$ value of a set of $\alpha^t$ values, wherein $\alpha$ is between 0 and 1, said weighting each training point resulting in a decrease of weights of older training points of said augmented set of training points;

retiring any training point of said augmented set in response to said associated $\alpha^t$ value differing from zero by less than a first predetermined amount;

training all binary classifiers for a predefined number of additional rounds;

weighting each vote of said T weak learners in said model by an associated $\beta^t$ value of a set of $\beta^t$ values, wherein $\beta$ is between 0 and 1, said weighting each vote resulting in an emphasis of one or more votes of a subset of most recently trained weak learners, said subset of most recently trained weak learners being a subset of said T weak learners; and retiring, from said model, any weak learner of said T weak learners in response to said associated $\beta^t$ value differing from zero by less than a second predetermined amount.

9. The computing system of claim 6, wherein said method further comprises adapting to a change in said workload, wherein a new query execution plan meets the predetermined threshold coverage and a query execution plan cache for storing said new query execution plan is not at capacity, said adapting comprising:

increasing a size of said ECOC table to accommodate a new class, said increasing resulting in an increased ECOC table;

fully training additional binary classifiers for one or more new columns of said increased ECOC table, said one or more new columns not included in said ECOC table prior to said increasing; and retraining other binary classifiers for classes other than said new class, said retraining including training said other binary classifiers for a predetermined number of rounds to incorporate training data for said new class, said training for said predetermined number of rounds not including a full training of said other binary classifiers.

10. The computing system of claim 6, wherein said method further comprises adapting to a change in said workload, wherein a new query execution plan meets the predetermined threshold coverage and a query execution plan cache cannot store said new query execution plan without retiring an existing query execution plan of a plurality of existing query execution plans stored in said query plan cache, said adapting comprising:
   selecting said existing query execution plan from said plurality of existing query execution plans;
   retiring one or more training points of said augmented training set, said one or more training points associated with a class of said existing query execution plan;
   maintaining said ECOC table with no changes;
   retraining one or more binary classifiers for a predefined number of rounds to incorporate said new set of training points, said retraining said one or more binary classifiers not including a full training of said one or more binary classifiers.

11. A computer-based method of automatically and adaptively determining query execution plans for queries having parameter markers, said method comprising:
   generating, by a computing system, a first classifier trained by an initial set of training points, wherein the initial set of training points consists of selectivities;
   generating a set of random decision trees (RDTs), said set of RDTs having a predetermined number of RDTs, wherein said generating said set of RDTs includes defining a generation procedure for each RDT of said set of RDTs, wherein said defining said generation procedure includes:
      choosing a selectivity of a plurality of selectivities for a first node of an RDT of said set of RDTs, said chosen selectivity not used in a higher level node of said RDT's hierarchy;
      selecting a decision threshold value for said chosen selectivity, said decision threshold value separating a set of query execution plans in said first node into two disjoint subsets of said set of query execution plans; and
      recursively using said generation procedure to expand said RDT for each subset of said two disjoint subsets until a number of query execution plans in a subset of said two disjoint subsets is fewer than a predefined minimum query execution plan threshold, a depth of said RDT reaches a depth threshold based on predefined criteria, or all query execution plans of said subset of said two disjoint subsets belong to a single type;
   dynamically updating, by a computing system at a first runtime thereof, at least one of a workload of queries processed by a database of said computing system and database statistics collected by said database for computing said plurality of selectivities;
   collecting, by a computing system in an off-line phase thereof, said off-line phase being subsequent to said first runtime, a new set of training points, said collecting responsive to a detection of said dynamically updating;
   modifying, by said computing system in said off-line phase, said first classifier into a second classifier, said modifying including utilizing said new set of training points;
   receiving, by said computing system at a second runtime thereof, said second runtime being subsequent to said off-line phase, a query for said database, said query including one or more predicates, each predicate including one or more parameter markers bound to one or more actual values; and
   automatically determining a query execution plan by a processor of said computing system, wherein said automatically determining includes:
      mapping, by said second classifier, one or more selectivities of said one or more predicates into said query execution plan, wherein said query execution plan is included in an augmented set of training points, said augmented set including said initial set of training points and said new set of training points;
      traversing a plurality of decision paths in said set of RDTs, wherein a decision path of said plurality of decision paths starts at a root of said RDT and ends at a leaf node of said RDT, wherein said traversing includes obtaining, across said set of RDTs, a set of posterior probabilities that are based on said augmented set of training points and said query execution plan, and obtaining, across said set of RDTs, one or more other sets of posterior probabilities that are based on one or more other query execution plans;
      computing a first average of said posterior probabilities included in said set of posterior probabilities;
      comparing said first average of said posterior probabilities to one or more other averages of said one or more other sets of posterior probabilities, wherein said comparing includes identifying said first average of said posterior probabilities as an optimal average selected from the group consisting of said first average of said posterior probabilities and said one or more other averages of said one or more other sets of posterior probabilities, and wherein said identifying said first average of said posterior probabilities as said optimal average includes utilizing a loss function;
      identifying said query execution plan as having the optimum average posterior probability, wherein said identifying said query execution plan is based on selecting said optimal average in response to said identifying said first average as said optimal average; and
      providing said query execution plan as a prediction of an output of a query optimizer of said database without utilizing said query optimizer to provide said output.

* * * * *